US010737329B2

(12) United States Patent
Milesi et al.

(10) Patent No.: US 10,737,329 B2
(45) Date of Patent: Aug. 11, 2020

(54) BAR LOADER APPARATUS FOR USE WITH A MACHINE TOOL AND MACHINE TOOL EQUIPPED WITH SUCH BAR LOADER APPARATUS

(71) Applicant: GILDEMEISTER ITALIANA S.P.A., Brembate di Sopra (IT)

(72) Inventors: Luca Milesi, San Giovanni Bianco (IT); Mirko Passerini, Gaggiano (IT); Franco Rigolone, Ponteranica (IT)

(73) Assignee: GILDEMEISTER ITALIANA S.P.A., Brembate di Sopra (IT)

( * ) Notice: Subject to any disclaimer, the term of this patent is extended or adjusted under 35 U.S.C. 154(b) by 0 days.

(21) Appl. No.: 16/014,772

(22) Filed: Jun. 21, 2018

(65) Prior Publication Data
US 2018/0369921 A1    Dec. 27, 2018

(30) Foreign Application Priority Data

Jun. 21, 2017    (EP) .................................... 17177209
Jun. 21, 2017    (EP) .................................... 17177210
Jul. 24, 2017    (EP) .................................... 17182775

(51) Int. Cl.
*B23B 13/04*    (2006.01)
*B23B 13/02*    (2006.01)
(Continued)

(52) U.S. Cl.
CPC ............ *B23B 13/022* (2013.01); *B23B 13/02* (2013.01); *B23B 13/04* (2013.01); *B23B 13/10* (2013.01); *B23B 13/123* (2013.01); *B23Q 7/02* (2013.01)

(58) Field of Classification Search
CPC ....... B23B 13/04; B23B 13/025; B23B 13/10; B23B 13/123; Y10T 82/2521; Y10T 82/14; Y10T 82/16; Y10T 82/18
See application file for complete search history.

(56) References Cited

U.S. PATENT DOCUMENTS 1,743,862 A    1/1930    Morris
2,040,872 A    5/1936    Oberhoffken
(Continued)

FOREIGN PATENT DOCUMENTS

DE    20 2005 015906 U1    2/2007
DE    20 2011 003069 U1    4/2011
(Continued)

OTHER PUBLICATIONS

Jul. 11, 2019 Office Action issued in U.S. Appl. No. 16/014,846.
(Continued)

*Primary Examiner* — Alan Snyder
(74) *Attorney, Agent, or Firm* — Oliff PLC

(57) ABSTRACT

The present disclosure relates to a bar loader and machine tool equipped with such bar loader, wherein the machine tool includes at least one workpiece spindle configured to receive an elongated workpiece, and the bar loader apparatus comprises, for each workpiece spindle of the machine tool being configured to move in a longitudinal direction being axially arranged with respect to the spindle axis of the respective workpiece spindle, a respective associated workpiece guide channel assembly for receiving and guiding a respective one of the elongated workpieces, and each respective workpiece guide channel assembly includes a fixed guide channel portion and at least one slidable guide channel portion, the at least one slidable guide channel portion being movable into the longitudinal direction of the spindle axis of the respective associated workpiece spindle.

18 Claims, 17 Drawing Sheets

(51) Int. Cl.
  *B23Q 7/02*   (2006.01)
  *B23B 13/10*  (2006.01)
  *B23B 13/12*  (2006.01)

(56) References Cited

U.S. PATENT DOCUMENTS

| | | | |
|---|---|---|---|
| 2,055,434 A | 9/1936 | Gridley et al. | |
| 2,096,754 A | 10/1937 | Oberhoffken et al. | |
| 2,107,543 A | 2/1938 | Miller | |
| 2,429,938 A | 10/1947 | Mansfield | |
| 2,848,913 A | 8/1958 | Thomsen | |
| 2,861,322 A | 11/1958 | Benes et al. | |
| 2,921,364 A | 1/1960 | Petzoldt | |
| 3,078,547 A | 2/1963 | Sweet | |
| 3,090,283 A | 5/1963 | Chaffee, Jr. | |
| 3,121,281 A | 2/1964 | Petro | |
| 3,339,440 A | 9/1967 | Tsuda | |
| 3,371,567 A | 3/1968 | Paul | |
| 3,508,311 A | 4/1970 | Fink | |
| 3,750,498 A | 8/1973 | Willen | |
| 3,794,436 A | 2/1974 | Rowlett | |
| 3,798,720 A | 3/1974 | Ledergerber et al. | |
| 3,978,565 A | 9/1976 | Flisch | |
| 3,981,056 A | 9/1976 | Gilbert et al. | |
| 4,122,735 A * | 10/1978 | Evers | B23B 13/021 82/126 |
| 4,292,864 A * | 10/1981 | Cucchi | B23B 13/04 82/126 |
| 4,308,771 A | 1/1982 | Windle | |
| 4,630,979 A | 12/1986 | Roux | |
| 4,638,693 A * | 1/1987 | Sugimoto | B23B 13/08 414/14 |
| 4,665,781 A | 5/1987 | Eichenhofer et al. | |
| 4,771,662 A | 9/1988 | Eichenhofer et al. | |
| 4,779,318 A | 10/1988 | Henderson | |
| 5,016,334 A | 5/1991 | Kovalenko et al. | |
| 5,044,055 A | 9/1991 | Howarth et al. | |
| 5,076,123 A | 12/1991 | McConkey | |
| 5,111,562 A | 5/1992 | Burka | |
| 5,115,702 A * | 5/1992 | Link | B23B 13/02 29/37 R |
| 5,320,010 A * | 6/1994 | Geiser | B23B 13/027 414/18 |
| 5,586,477 A * | 12/1996 | Babuder | B23B 13/04 414/17 |
| 5,730,037 A | 3/1998 | Manning | |
| 5,860,340 A * | 1/1999 | Cucchi | B23B 13/02 414/14 |
| 5,881,617 A * | 3/1999 | Cucchi | B23B 13/04 414/17 |
| 5,896,793 A * | 4/1999 | Haller | B23B 13/04 414/14 |
| 5,924,344 A | 7/1999 | Link et al. | |
| 5,970,830 A * | 10/1999 | von Niederhausern | B23B 13/02 414/14 |
| 6,044,736 A | 4/2000 | Cucchi | |
| 6,049,965 A | 4/2000 | Perkins, Jr. | |
| 6,219,895 B1 | 4/2001 | Muscarella et al. | |
| 9,724,760 B2 | 8/2017 | Kawasumi | |
| 2002/0129683 A1 | 9/2002 | Ollis | |
| 2003/0101854 A1* | 6/2003 | Cucchi | B23B 13/04 82/127 |
| 2004/0163509 A1 | 8/2004 | Zuccalli | |
| 2005/0126353 A1 | 6/2005 | Trautmann | |
| 2006/0196325 A1 | 9/2006 | Sakai | |
| 2006/0219068 A1 | 10/2006 | Uebelhart | |
| 2008/0092701 A1* | 4/2008 | Yamaguchi | B23B 13/08 82/127 |
| 2009/0180856 A1* | 7/2009 | Hirosawa | B23B 13/02 414/745.1 |
| 2010/0058903 A1 | 3/2010 | Rigolone et al. | |
| 2010/0307301 A1 | 12/2010 | Zwara et al. | |
| 2011/0048184 A1* | 3/2011 | Casalini | B23B 13/04 82/127 |
| 2013/0025408 A1 | 1/2013 | Vettori | |
| 2014/0251096 A1 | 9/2014 | Hankey | |
| 2015/0266114 A1 | 9/2015 | Kopton | |
| 2015/0328735 A1 | 11/2015 | Lutz et al. | |
| 2016/0158845 A1* | 6/2016 | Cucchi | B23B 13/025 82/126 |

FOREIGN PATENT DOCUMENTS

| | | |
|---|---|---|
| EP | 0 611 621 A1 | 8/1994 |
| EP | 0 700 742 A1 | 3/1996 |
| EP | 0 785 040 A1 | 7/1997 |
| EP | 1 163 976 A1 | 12/2001 |
| EP | 1 332 814 A2 | 8/2003 |
| EP | 1 570 931 A2 | 9/2005 |
| EP | 2 163 334 A1 | 3/2010 |
| EP | 2 277 658 A1 | 1/2011 |
| EP | 2 364 801 A1 | 9/2011 |
| EP | 2364801 A1 | 9/2011 |
| EP | 2 567 782 A1 | 3/2013 |
| EP | 2163334 B2 | 8/2016 |
| FR | 2 049 374 A5 | 3/1971 |
| FR | 2 629 745 A1 | 10/1989 |
| GB | 1 013 878 A | 12/1965 |
| GB | 2 383 283 A | 6/2003 |
| JP | S60-114436 A | 6/1985 |
| WO | 2013/189937 A1 | 12/2013 |

OTHER PUBLICATIONS

Aug. 21, 2019 Office Action issued in U.S. Appl. No. 16/014,931.
Oct. 24, 2019 U.S. Office Action issued U.S. Appl. No. 16/014,846.
Feb. 4, 2020 U.S. Office Action issued U.S. Appl. No. 16/014,931.
Mar. 20, 2018 Search Report issued in European Patent Application No. 17177210.6.
U.S. Appl. No. 16/014,846, filed Jun. 21, 2018 in the name of Persico et al.
U.S. Appl. No. 16/014,931, filed Jun. 21, 2018 in the name of Passerini et al.
Dec. 19, 2017 Extended European Search Report issued in European Patent Application No. 17177209.8.
Mar. 9, 2018 Search Opinion issued in European Patent Application No. 17182775.1.

* cited by examiner

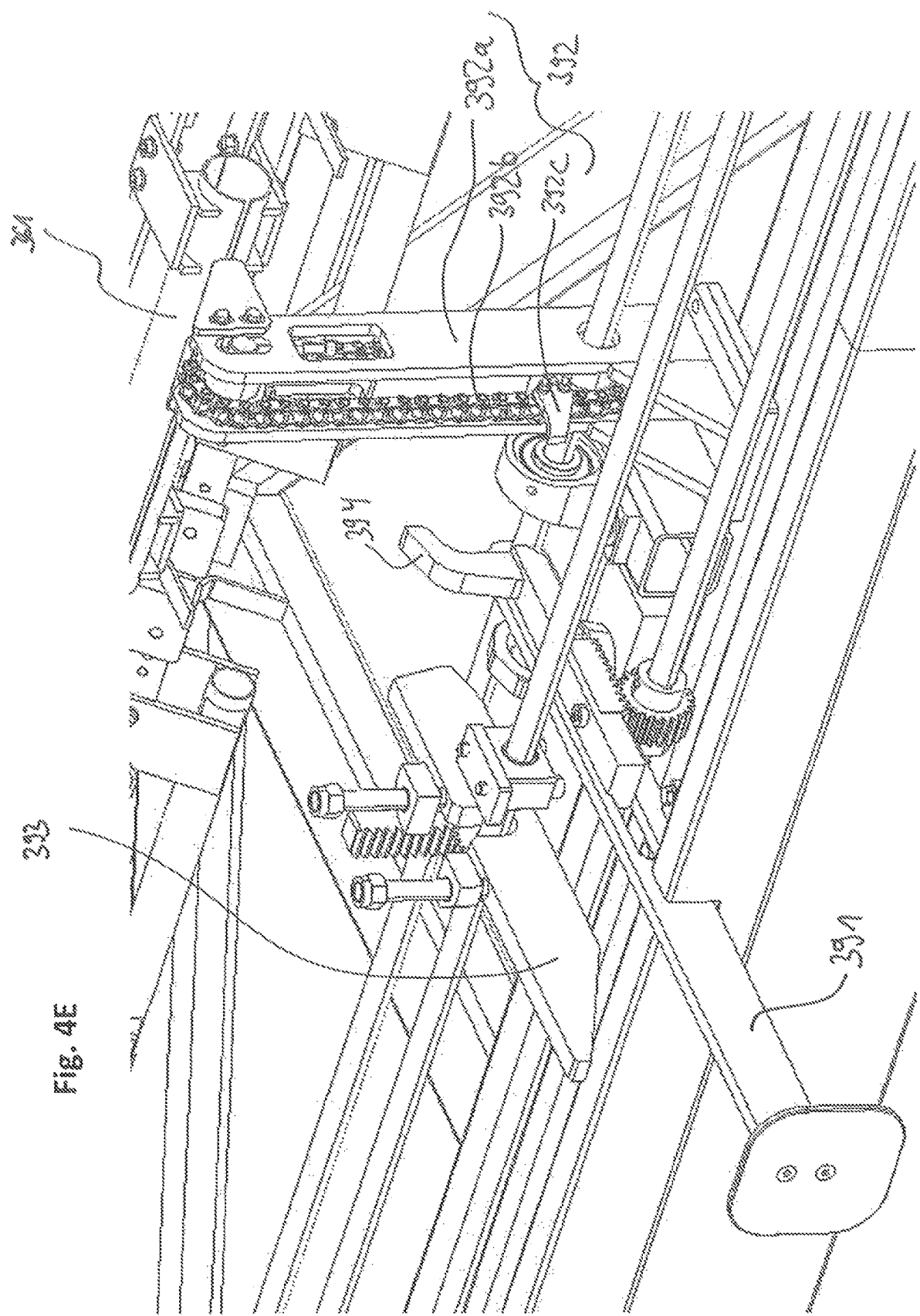

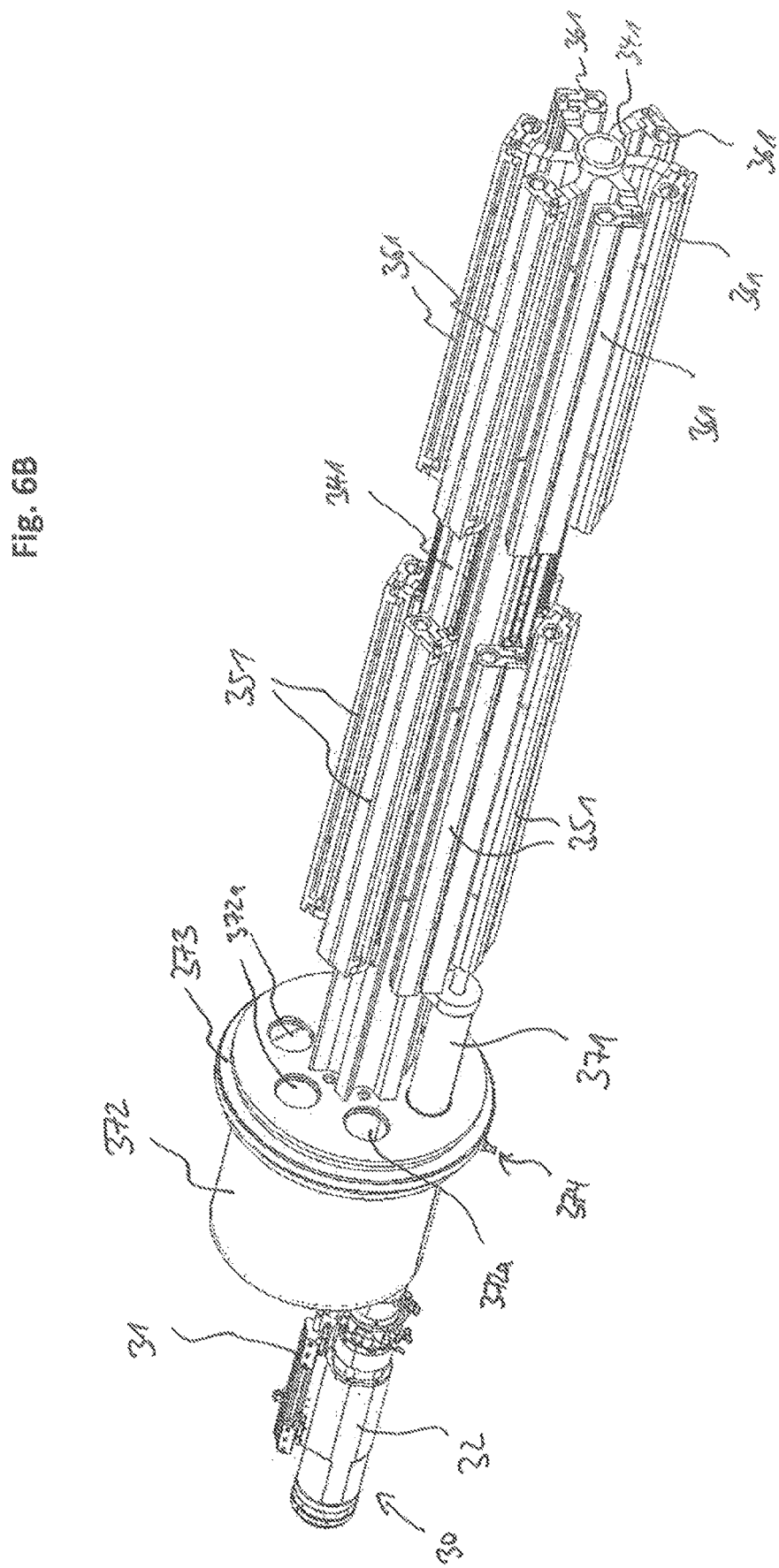

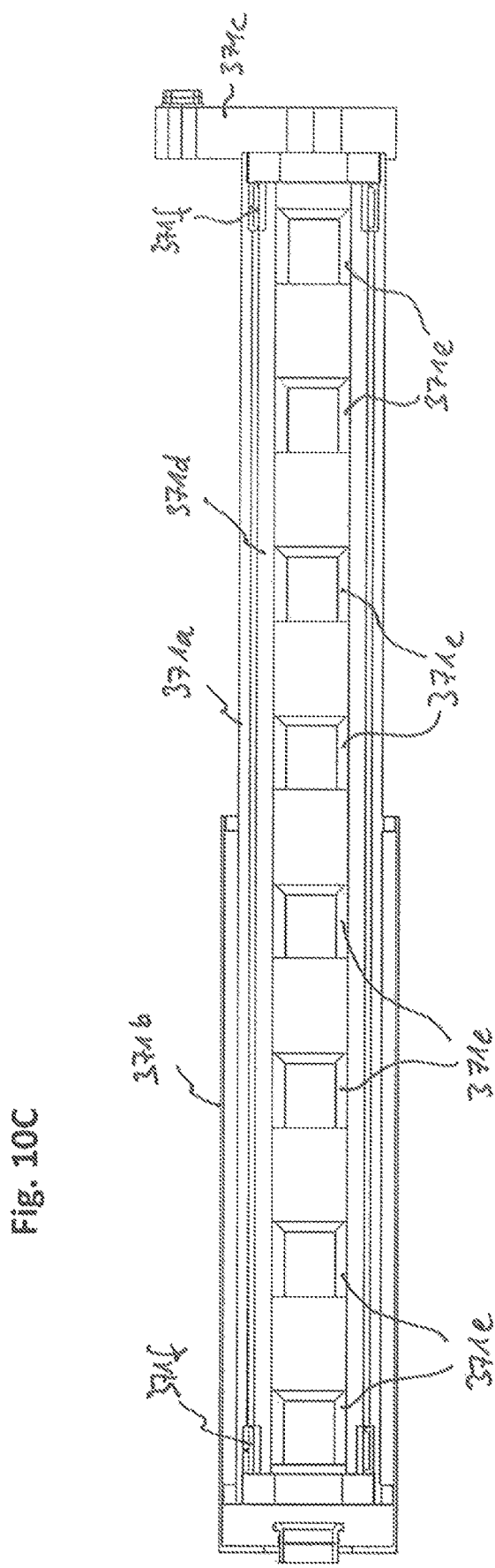

BAR LOADER APPARATUS FOR USE WITH A MACHINE TOOL AND MACHINE TOOL EQUIPPED WITH SUCH BAR LOADER APPARATUS

PRIORITY

This present application claims the priority of European patent applications Nos. 17177209.8 and 17177210.6, both of the European patent applications having been filed with the European Patent Office on Jun. 21, 2017.

DESCRIPTION

The present disclosure relates to a bar loader apparatus (in short referred to as bar loader) for use with (or at) a machine tool and to a machine tool, in particular a turning machine having a single main spindle or a multi-spindle turning machine having multiple main spindles, being equipped with such bar loader.

BACKGROUND

In the prior art, machine tools, in particular turning machines (otherwise sometimes referred to as lathes), are known, e.g., multi-spindle turning machines including multiple workpiece spindles (main spindles) supported on a rotary drum (turret or turret body), wherein the rotary drum/turret body is configured to rotate/index the rotary drum/turret body around a longitudinal axis thereof.

For example, in EP 2 163 334 B2, a multi-spindle turning machine having plural main spindles is described that has multiple workpiece spindles (main spindles) supported on a rotary drum, wherein the rotary drum is configured to rotate/index the rotary drum around a longitudinal axis thereof, and, for each workpiece spindle there is provided a tool assembly holding one or more tools. For relative movement between the workpieces received at the workpiece spindles and the tools of the tool assemblies, the spindles are movable in a Z-direction being axially arranged with the respective spindle axis. Further, each of the tool assemblies is configured to move in a radial X-direction with respect to the longitudinal rotation axis of the drum and in a tangential Y-direction with respect to the longitudinal rotation axis of the drum.

Furthermore, turning machines having a single main spindle—but not being limited to only one spindle since another counter-spindle may, for example, be provided—are known in the prior art.

Such turning machines may be configured to execute machining operations on a workpiece such as a bar (may also be referred to as a rod), for example, wherein the bar is held at the main spindle or at one of the main spindles, the bar being rotationally driven about its longitudinal axis by the respective main spindle, and the bar may be machined by one or more stationary or rotating cutting tools on a front side thereof extending out of the respective main spindle.

In order to load bars for the machining operations to the machine tool, in particular turning machine, bar loader devices are known in the prior art. For example, EP 2 364 801 A1 shows a bar loader configured to store a plurality of bars and to respectively load one of the plurality of bars to a machine tool, specifically to a spindle of a turning machine.

Specifically, the bar loader of EP 2 364 801 A1 comprises a storage portion configured to store one or more elongated workpieces, in particular bars, a loading system configured to load at least one elongated workpiece from the loading system to the at least one workpiece spindle of the machine tool, and a transfer device configured to transfer an elongated workpiece from the storage portion to the loading system.

It is an object of the present disclosure to provide a bar loader device, for use at or with a turning machine having one or more main spindles—being compact, efficient, reliable and having improved bar loading capabilities with improved bar guidance capabilities during the bar loading operations and during the machining operations at the machine tool, not only for short bars but even for longer bars.

It is another object of the present disclosure to further develop the concept of the multi-spindle turning machine of EP 2 163 334 B2, taking into account the above, and particularly to enhance the bar loading capabilities and bar guidance capabilities, during the bar loading operations and also during machining options at the multi-spindle turning machine, to provide a compact machine concept, allowing for more flexible, accurate, efficient and reliable machining operations, and/or to improve accuracy and/or stability of the machine tool.

SUMMARY

In view of one or more of the above objects, there is proposed a bar loader apparatus and a machine tool according to the independent claims. The dependent claims relate to preferred exemplary embodiments.

The present invention proposes a bar loader apparatus (or a combination of a machine tool with a bar loader apparatus, wherein the machine tool may be a single-spindle, double-spindle or multi-spindle lathe or turning machine).

The bar loader apparatus may be configured to supply elongated workpieces, e.g. bars, from the rear side of the machine tool into the respective workpiece spindles of the one or more workpiece spindles of the machine tool.

Specifically, the bar loader of an aspect may comprise a storage portion configured to store one or more elongated workpieces, in particular bars, a loading system configured to load at least one elongated workpiece from the loading system to the at least one workpiece spindle of the machine tool, and a transfer device configured to transfer an elongated workpiece from the storage portion to the loading system.

According to an aspect, the loading system may comprise, for each workpiece spindle of the machine tool being configured to move in a longitudinal direction being axially arranged with respect to the spindle axis of the respective workpiece spindle, a respective associated workpiece guide channel assembly for receiving and/or guiding one of the elongated workpieces and the workpiece guide channel assembly being configured to be axially arranged with respect to the spindle axis of the respective workpiece spindle.

Furthermore, each respective workpiece guide channel assembly may include a fixed guide channel portion and at least one slidable guide channel portion. The at least one slidable guide channel portion may be configured to be movable into the longitudinal direction of the spindle axis of the respective associated workpiece spindle.

For example, an aspect of such bar loader apparatus may be that a bar loader guiding system is provided that includes three portions, including a fixed guide portion, a slidable middle guide portion and a slidable end guide portion, the slidable portions being arranged to have individual guides for each associated spindle (of the one or more main spindles of a machine tool) which are respectively slidable into a direction of a spindle axis of its respective associated workpiece spindle.

Such aspects as described above may be provided for single-spindle, double-spindle or multi-spindle lathe or turning machines, in case of multi-spindle machines with or without rotary turret body.

According to an exemplary aspect, the respective workpiece guide channel assembly may be configured to be axially arranged with respect to the spindle axis of the respective workpiece spindle. The fixed guide channel portion of the respective workpiece guide channel assembly may extend in the longitudinal direction and/or the at least one slidable guide channel portion of the respective workpiece guide channel assembly may extend in the longitudinal direction.

According to an exemplary aspect, the fixed guide channel portion of the respective workpiece guide channel assembly may be configured to be opened laterally, for receiving an elongated workpiece transferred from the storage portion by the transfer device, and to be closed to form a guide channel for the received elongated workpiece for holding the received elongated workpiece.

According to an exemplary aspect, at least one slidable guide channel portion of the respective workpiece guide channel assembly may comprise a guide tube having a guide channel for guiding the elongated workpiece.

According to an exemplary aspect, the guide tube is preferably rotationally fixed. According to another exemplary aspect, the guide tube is preferably rotatably supported to be configured to rotate about an axial direction thereof, in particular preferably being rotatably supported in an outer tube housing by bearings.

According to an exemplary aspect, the respective workpiece guide channel assembly may include at least two slidable guide channel portions. At least another slidable guide channel portion of the respective workpiece guide may be configured to be opened laterally, for receiving an elongated workpiece transferred from the storage portion by the transfer device, and to be closed to form a guide channel around the received elongated workpiece for holding the received elongated workpiece.

According to an exemplary aspect, the openable slidable guide channel portion may be arranged between the guide tube and the openable fixed guide channel portion, in particular adjacent to the openable fixed guide channel portion.

According to an exemplary aspect, the bar loader may be configured to laterally open the openable fixed guide channel portion and the openable slidable guide channel portion of the respective workpiece guide together, for receiving an elongated workpiece transferred from the storage portion by the transfer device in both of the openable fixed guide channel portion and the openable slidable guide channel portion of the respective workpiece guide.

According to an exemplary aspect, the openable fixed guide channel portion and/or the openable slidable guide channel portion preferably include one or more guide assemblies, wherein each guide assembly may include a first guide channel element and one or more second guide channel elements being preferably pivotable relatively with respect to the first guide channel element e.g. for closing and/or opening the respective guide channel portion.

According to an exemplary aspect, one or more guide elements preferably having a V-shaped portion, e.g. for laterally receiving a workpiece in an opened state of the respective guide channel portion, are preferably attached to the first guide channel element to pivot, together with the first guide channel element, preferably relatively with respect to the and one or more second guide channel elements.

According to an exemplary aspect, the one or more guide elements having a V-shaped portion are preferably attached to the first guide channel element so as to preferably rise into a region between the first and second guide channel elements when pivoting the first and second guide channel elements away from each other for opening the respective guide channel portion, and/or so as to preferably disappear from the region between the first and second guide channel elements into or through a space adjacent to and/or between the one or more second guide channel elements when pivoting the first and second guide channel elements towards each other for closing the respective guide channel portion, in particular preferably for smoothly moving a workpiece received at a tip portion of the V-shaped portion of the one or more guide elements into the guide channel forming between the first and second guide channel elements in the closed state of the respective guide channel portion.

According to an exemplary aspect, in case the machine tool comprises a plurality of workpiece spindles being respectively configured to move in a longitudinal direction being axially arranged with respect to the spindle axis of the respective workpiece spindle, the loading system may comprise, for each of the plurality of workpiece spindles, a respective associated workpiece guide channel assembly, and, for each of the plurality of workpiece guide channel assemblies, the at least one slidable guide channel portion of the respective workpiece guide channel assembly may be movable into the longitudinal direction of the spindle axis of the respective associated workpiece spindle independently of slidable guide channel portions According to an exemplary aspect, in case the machine tool comprises a turret body being rotatably supported about a turret axis by a machine frame of the machine tool, the loading system may further comprise a rotatably supported turret fixture body being configured to be attached to the turret body for rotating together with the turret body of the machine tool about the turret axis.

According to an exemplary aspect, e.g. when the machine tool comprises a turret body being rotatably supported about a turret axis by a machine frame of the machine tool and the turret body supports a plurality of workpiece spindle, the bar loader may further comprise a rotatable pot body being fixed to rotate with the turret fixture body, the turret body and the plurality of workpiece spindles being preferably supported by the turret body, the rotatable pot body being preferably configured to collect cooling and/or lubricating liquid output from back-side portions of the workpiece spindles.

Preferably, the rotatable pot body is rotatably supported at a non-rotating collecting ring element preferably having at least one outlet for cooling and/or lubricating liquid collected within the rotatable pot body.

According to an aspect, there may be further provided a machine tool, in particular a turning machine, comprising at least one workpiece spindle configured to receive an elongated workpiece, and a bar loader apparatus according to at least one of the above aspects.

According to some further aspects, there may be provided a machine tool, in particular preferably a multi-spindle turning machine, comprising a machine frame, a turret body being rotatably supported by the machine frame, a plurality of workpiece spindles being arranged on the turret body, each of the workpiece spindles having a workpiece receiving portion for receiving a respective workpiece on one side of the turret body facing a working space of the machine tool.

In some exemplary aspects, each of the workpiece spindles may preferably be movable and/or slidable in a longitudinal direction (Z-direction), e.g. in parallel with the longitudinal rotational axis of the turret body and/or in parallel with the respective spindle axis. Accordingly, an advantageously compact design with independent accurate spindle movement in spindle axis direction can be provided.

In some exemplary aspects, the machine tool further comprises a plurality of tool post assemblies supported by the machine frame around the turret body.

In some exemplary aspects, each tool post assembly is movable in one or two directions transversely or perpendicularly to the respective spindle axis.

In some exemplary aspects, each tool post assembly is movable in a respective X-direction being perpendicular to the respective spindle axis and/or radially arranged with respect to the longitudinal axis of the turret body.

In some exemplary aspects, each tool post assembly is movable in a respective Y-direction being perpendicular to the respective spindle axis and/or tangentially arranged with respect to the longitudinal axis of the turret body.

While certain exemplary aspects have been described above, it is to be understood that such aspects are merely illustrative of and are not restrictive on the broad invention, and that the exemplary aspects are not limited to the specific constructions and arrangements shown and described above, since various other changes, combinations, omissions, modifications and substitutions, in addition to those set forth in the above paragraphs, are possible.

Those skilled in the art will appreciate that various adaptations, modifications, and/or combination of the just described aspects can be configured. Therefore, it is to be understood that, further aspects may be practiced other than as specifically described herein. Those skilled in the art will also appreciate, in view of this disclosure, that different aspects described herein may be combined to form other aspects of the present disclosure.

BRIEF DESCRIPTION OF THE DRAWINGS

FIGS. 4A to 4E exemplary illustrate further schematic perspective views of inner parts of the bar loader of FIGS. 3A to 3C;

FIGS. 6A to 6C exemplarily illustrate further schematic perspective views of inner parts of a bar loader of another exemplary embodiment;

FIGS. 10A to 10C exemplary illustrate schematic views of details of the guide tube assembly of a bar loader according to FIG. 9.

DETAILED DESCRIPTION OF THE DRAWINGS AND DESCRIPTION OF EXEMPLARY EMBODIMENTS

Figure 1:
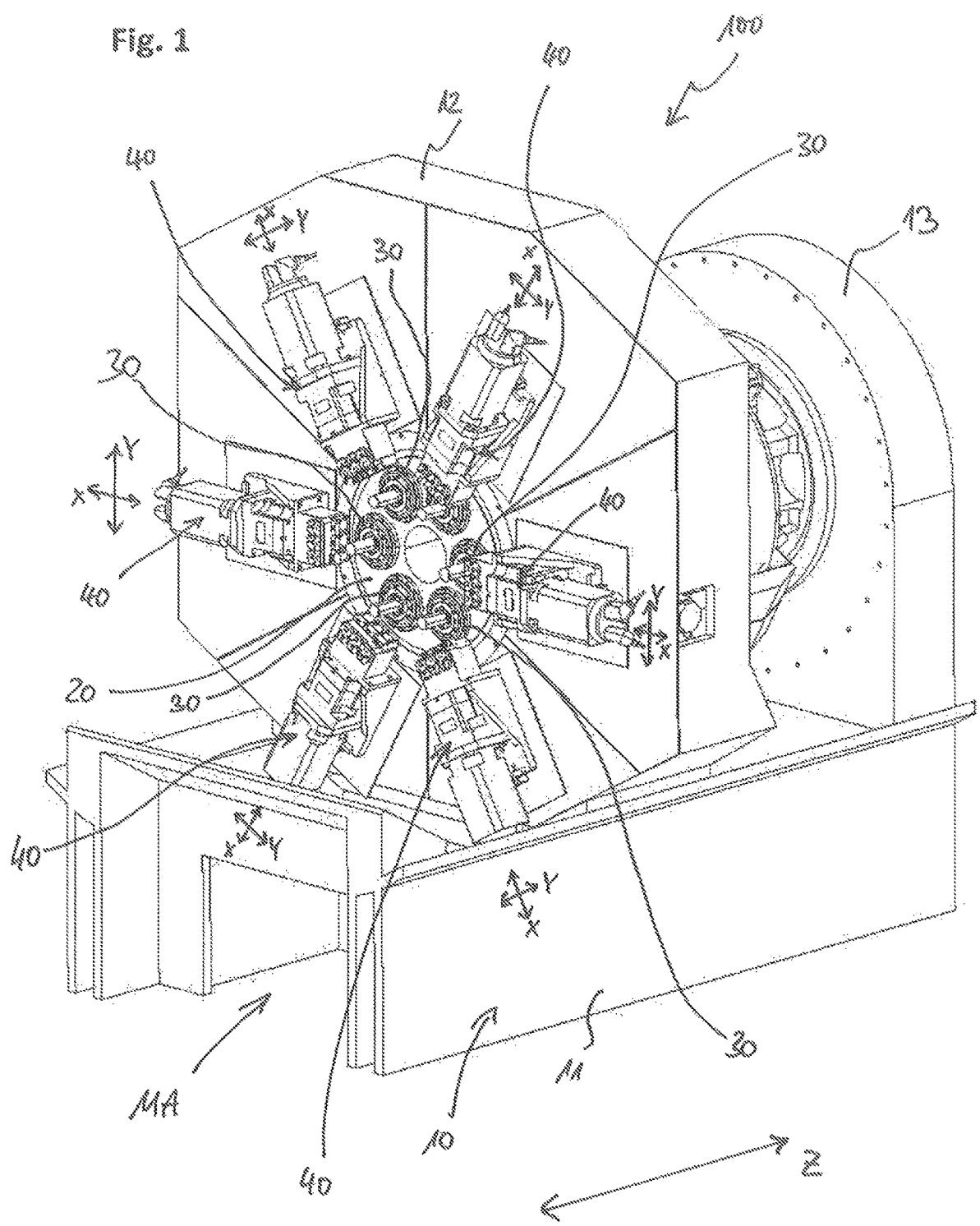
FIG. 1 exemplarily illustrates a schematic front-side perspective view of a multi-spindle turning machine according to an exemplary embodiment.

In the following, preferred aspects and embodiments will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

It is important to note that the below described exemplary embodiments refer to configurations relating to a multi-spindle turning machine having multiple workpiece spindles arranged on a rotating turret body. For such multi-spindle turning machine, exemplarily multiple axially arranged rows of bar guide portions 361, 351 and 371, one row per spindle, are exemplarily described. However, it is to be noted that the present invention is also applicable for other types of turning machines or lathes, including single spindle turning machines (e.g. having a main spindle and optionally including one or more counter-spindles), wherein in such case only one row of bar guide portions 361, 351 and 371 may be provided, e.g. without a rotating body 340/341. Accordingly, aspects of below-described embodiments regarding bar guide portions 361, 351 and 371 may also apply to other types of turning machines or lathes, including single spindle turning machines.

FIG. 1 exemplarily illustrates a schematic perspective view of a multi-spindle turning machine 100 according to an exemplary embodiment.

The multi-spindle turning machine 100 of FIG. 1 exemplarily comprises a machine frame 10 which exemplarily includes a machine bed 11, a first machine frame upright 12 (front frame portion) and a second machine frame upright 13 (back frame portion), wherein the first machine frame upright 12 and the second machine frame upright 13 are arranged on the machine bed 11.

A turret body 20 (spindle drum) is rotatably supported exemplarily by the first machine frame upright 12 and the second machine frame upright 13 of the machine frame 10 of the multi-spindle turning machine 100. The turret body 20 exemplarily supports a plurality of workpiece spindles 30, exemplarily arranged such that a respective spindle axis of the workpiece spindles 30 is arranged in parallel with the rotational axis (longitudinal axis) of the turret body 20. Specifically, the workpiece spindles 30 are exemplarily arranged around the rotational axis (longitudinal axis) of the turret body 20, exemplarily with equiangular distance.

The turret body 20 is rotatably supported by each of the first and second machine frame uprights 12 and 13, and a free space is provided between the first and second machine frame uprights 12 and 13, so that exemplarily the turret body 20 is only supported by the two machine frame uprights 12 and 13. Specifically, exemplarily a front end portion of the turret body 20 is rotatably supported by the first machine frame upright 12 (front frame portion) and a back end portion of the turret body 20 is rotatably supported by the second machine frame upright 13 (back frame portion).

In FIG. 1, the turret body 20 exemplarily carries six workpiece spindles 30, but the invention is not limited to configurations with six workpiece spindles 30 arranged on the turret body 20, but the number of spindles can be also less or more than six, e.g. a turret body carrying four, five, seven, eight or more workpiece spindles. Exemplarily, for six workpiece spindles 30, the equiangular distance between the respective adjacent workpiece spindles is ⅙ of 360°, i.e. exemplarily 60°.

Further exemplarily, the first machine frame upright 12 (front frame portion) supports, for each of the workpiece spindles 30, a respective tool post assembly 40 for carrying tools for processing/machining workpieces received at the respective workpiece spindles 30. Accordingly, in the present example, the first machine frame upright 12 (front frame portion) supports six tool post assemblies 40, exemplarily at the similar equiangular distance between adjacent tool post assemblies as the equiangular distance between adjacent workpiece spindles 30.

By such configuration, in a machining position of the turret body, each of the tool post assemblies 40 is exemplarily positioned so as to be enabled to process a workpiece held by the currently associated workpiece spindle 30, and by indexing (rotating) the turret body 20, each of the workpiece spindles 30 can be moved to the next position of the next tool post assembly 40. Accordingly, the turret body 20 is configured to index/rotate the workpiece spindles 40 between the multiple machining positions of the respective tool post assemblies 40. Such rotation (indexing) of the turret body 20 can be made in clockwise and/or anti-clockwise direction.

Regarding the movement kinematics of the multi-spindle turning machine 100, exemplarily the one or more tools held by each of the tool post assemblies 40 can exemplarily be moved relative to the workpiece received at a respective workpiece spindle 30 in three translational directions (three linear degrees of freedom). Exemplarily, this is achieved in that each workpiece spindle 30 is moveable in a longitudinal direction which is axially arranged with respect to the respective spindle axis (referred to as "Z-direction"; Z-axis), and in that each tool post assembly 40 can be moved independently in two linear directions which are exemplarily perpendicular to each other and perpendicular to the longitudinal direction (Z-direction). Such directions are exemplarily referred to as "X-direction" (X axis) and "Y-direction" (Y axis).

Exemplarily, for each tool post assembly 40 the respective X-direction is arranged radially with respect to the rotational axis of the turret body 20 (i.e. the respective tool post assembly 40 can be moved in the X-direction perpendicular to and radially with respect to the rotational axis of the turret body 20), i.e. exemplarily perpendicular to the Z-direction of the respective workpiece spindle 30.

Exemplarily, for each tool post assembly 40 the respective Y-direction is arranged tangentially with respect to the rotational axis of the turret body 20 (i.e. the respective tool post assembly 40 can be moved in the Y-direction perpendicular to and tangentially with respect to the rotational axis of the turret body 20), i.e. exemplarily preferably perpendicular to the Z-direction of the respective workpiece spindle 30 and perpendicular to the respective X-direction of said respective tool post assembly 40.

On the side of the first machine frame upright 12 (front frame portion) opposite to the second machine frame upright 13 (back frame portion), a workspace is provided, on which side thereof the tool post assemblies 40 are provided on the first machine frame upright 12.

Below the tool post assemblies 40, exemplarily, a chip fall opening is provided in the machine bed 11 of the machine frame 10, and a conveyor opening 11A is provided in the machine bed 11 of the machine frame 10 on a front side thereof, and the conveyor opening 11A is provided to insert a chip conveyor (see e.g. FIG. 2, e.g. chip conveyor 200). An advantage is that chips being created by the machining processes of machining workpieces received at the workpiece spindles 30 by tools held by the tool post assemblies 40 can fall freely downwards from the spindle positions to fall through the chip fall opening into a chip collector portion of a chip conveyor inserted through the conveyor opening 11A.

Figure 2:
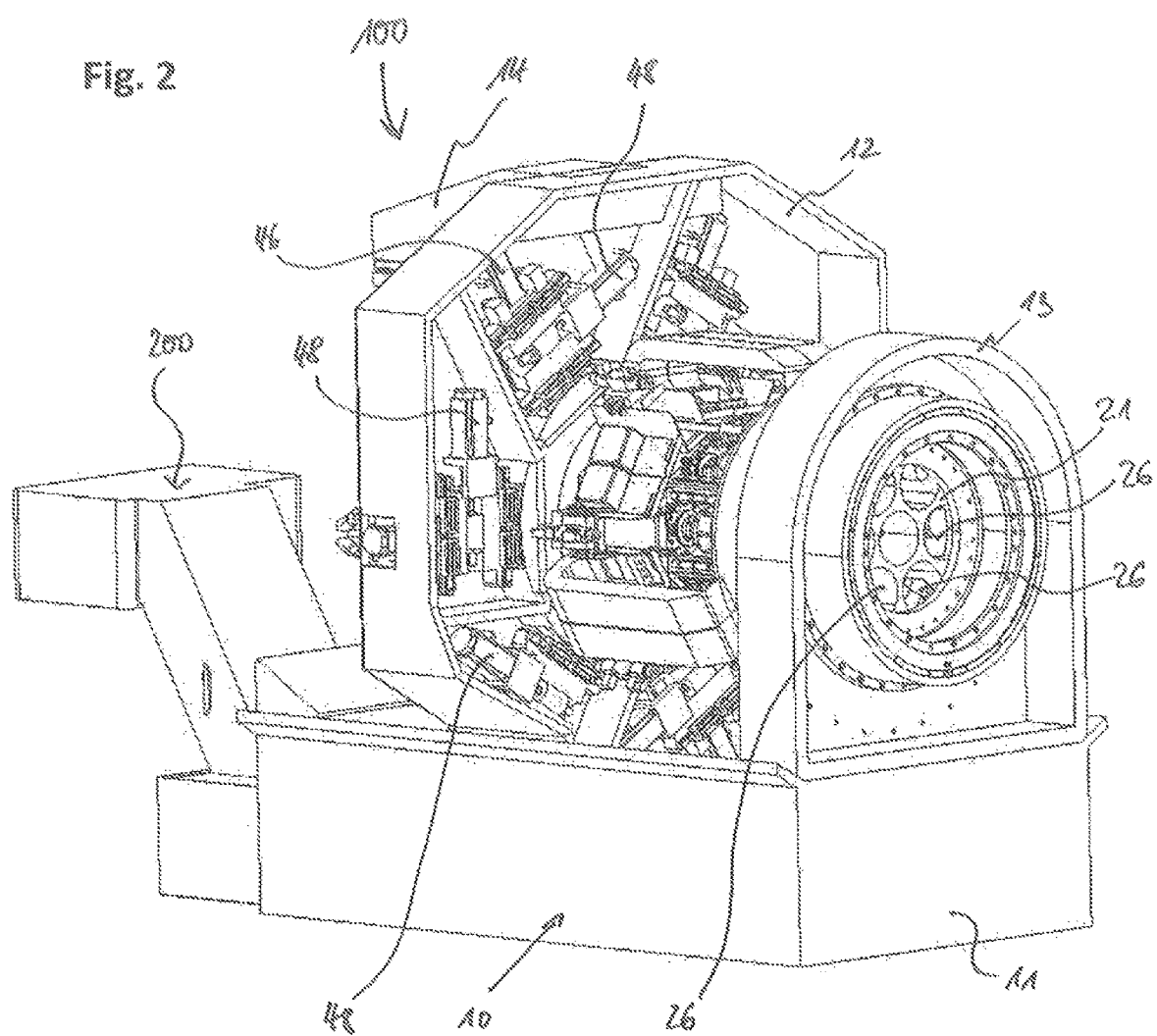
FIG. 2 exemplary illustrates a schematic back-side perspective view of the multi-spindle turning machine of FIG. 1 with an additional chip conveyor.

FIG. 2 exemplary illustrates a schematic back-side perspective view of the multi-spindle turning machine of FIG. 1 with an additional chip conveyor 200.

Exemplarily, each of the tool post assemblies 40 of the multi-spindle turning machine of FIG. 1 are configured similarly, only that they are mounted to the first machine frame upright 12 (front frame portion) on the face side facing the workspace such that the respective X- and Y-axes, which exemplarily are arranged perpendicularly with respect to each other, are arranged depending on the longitudinal axis of the turret body, e.g. in that the plane spanned by the respective X- and Y-axes is arranged perpendicular to the longitudinal axis of the turret body 20 (i.e. that each of the respective X- and Y-axes is arranged perpendicular to the longitudinal axis of the turret body 20), and in that the respective X-axis is arranged radially with respect to the longitudinal axis (rotational axis) of the turret body 20.

For providing the X- and Y-axes, the tool post assembly 40 exemplarily comprises a cross slide assembly including a first slide (X-slide) movable in the X-direction and a second slide (Y-slide) movable in the Y-direction, wherein the first slide (X-slide) is exemplarily arranged on the second slide (Y-slide).

The tool post assemblies 40 further exemplarily comprises respective drives 46 and 48, wherein the drive 46 (e.g. drive motor) is configured to drive the linear movement of the first slide (X-slide) into the X-direction and the drive 48 (e.g. drive motor) is configured to drive the linear movement of the second slide (Y-slide) into the Y-direction, see e.g. FIG. 2.

The X- and Y-direction movements can be independently driven and by simultaneously driving the X- and Y-direction movements, the tool post can be moved in any direction within the plane of the X- and Y-directions, perpendicularly to the longitudinal axis of the turret body 20 and perpendicular to the respective spindle axis of a respective workpiece spindle 30.

Guide elements, along which guides of the second slide (Y-slide) are guided, are mountable to the first machine frame upright 12 (front frame portion) at the respective positions as shown in FIGS. 1 and 2, for example.

Exemplarily, each of the tool post assemblies 40 of the multi-spindle turning machine of FIG. 1, may comprise a tool post which has a plurality (exemplarily three) tool receiving openings for receiving tools. Exemplarily, the tool receiving openings are arranged adjacent to each other and are arranged along the Y-direction.

This has the advantage that, by moving the tool post into the Y-direction, the respective tool, which actually engages the workpiece received at the respective workpiece spindle, can be changed among the tools received in the tool receiving openings. Accordingly, without actually inserting a new tool into the tool post, the tools engaging into the machining operation at a respective workpiece spindle 30 can be quickly, efficiently and reliably changed by merely moving the tool post into the Y-direction.

Also, the tool post assembly 40 is configured to drive tools received in the tool receiving openings (so-called live tools) by way of the optional drive mechanism including a drive (e.g. a drive motor in a drive housing) and a gearbox. Specifically, the gearbox may include a gear mechanism, which may be configured to allow for one or more gear changes for different gear ratios, and the gear mechanism may be driven by the drive so as to drive one or more of the tools received in the tool receiving openings.

For example, the gearbox may be configured to include a gear mechanism which may be set to (or switched between) one or more gear settings, which may be provided for driving one or more of the tools received in the tool receiving openings at high revolution speeds and/or high torque, e.g. depending on the intended machining condition and/or depending on the used live tool.

For fixedly holding tools or respective tool holding tool cartridges in the tool receiving openings (as cartridge-receiving openings), the tool post may be configured to enable mechanical fixing or locking the received tools or cartridges, e.g. by means of screws and/or a clamping or other mechanical locking mechanism, e.g. also including quick-acting fasteners or quick clamps.

In further exemplary embodiments, in alternative or in addition, the tool post may be equipped with automatically actuated locking/unlocking mechanisms to automatically lock/unlock tool cartridges received in the tool receiving openings (as cartridge-receiving openings) of the tool post. Specifically, such automatically actuated locking/unlocking mechanisms may be including mechanical, pneumatic, hydraulic and/or electric locking/unlocking mechanisms. Accordingly, locking/unlocking tool cartridges received in the tool receiving openings (as cartridge-receiving openings) of the tool post may actuated automatically by way of mechanical, pneumatic, hydraulic and/or electric actuators.

This would exemplarily advantageously allow for a possibility of an automatic tool change function to be provided at the multi-spindle turning machine. While automatic tool change mechanisms are well known in the field of machine tools with tool-carrying spindles, such as milling machines or milling machining centers, efficient and reliable automatic tool change mechanisms are not yet realized in the field of turning machines/lathes, specifically for multi-spindle turning machine, and therefore such automatic tool change system at a turning machine, such as a multi-spindle turning machine, is highly beneficial and significantly improves the versatility of the respective turning machine.

For example, in case of equipping a multiple-spindle turning machine with handing robots, such robots could be used to handle workpieces at the workpiece spindles (e.g. for workpiece removal after the machining process) and/or tools to be removed from or inserted to the tool post of one of the tool post assemblies 40.

Even without automatically actuated locking/unlocking mechanisms, the highly flexible and efficiently usable tool cartridge system with plural interchangeable tool holding cartridges fitted to the tool receiving openings makes it advantageously possible to efficiently, more quickly and accurately enable tool exchanges, be it made manually, automatically or semi-automatically, at the turning machine, such as the multi-spindle turning machine.

As previously mentioned, FIG. 2 exemplary illustrates a schematic back-side perspective view of the multi-spindle turning machine of FIG. 1 with an additional chip conveyor 200.

Exemplarily, the chip conveyor 200 (chip conveyor apparatus) includes a chip collector portion which is opened to the upper side. The chip collector portion may be inserted into the chip conveyor opening 11A of the machine bed 11 of the machine frame 10 of the multi-spindle turning machine, e.g. as illustrated in FIG. 1. Accordingly, when inserted in the conveyor opening 11A, the chips created by the machining operations of workpieces received at the workpiece spindles 30 being machined by the tools of the tool post assemblies 40 will advantageously be enabled to fall straight down into the chip collector portion of the chip conveyor 200.

The chip conveyor 200 exemplarily further includes an inclined conveying portion which internally has a conveyor system for conveying chips collected in the chip collector portion upwards towards the chip output portion, which has a lower opening to output conveyed chips, e.g. into a collector container that may be placed under the chip output portion. For driving the conveyor system, the chip conveyor 200 further may include a conveyor drive.

Figure 3A:
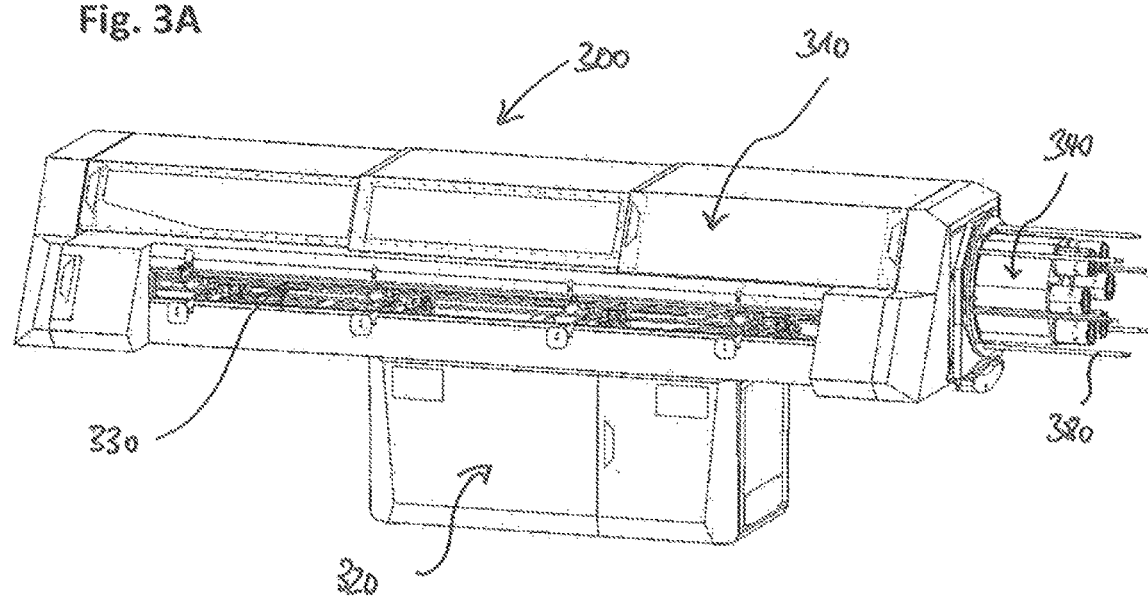
FIGS. 3A to 3C exemplary illustrate schematic perspective views of a bar loader according to an exemplary embodiment for use at a multi-spindle turning machine and of inner parts thereof.
Figure 3B:
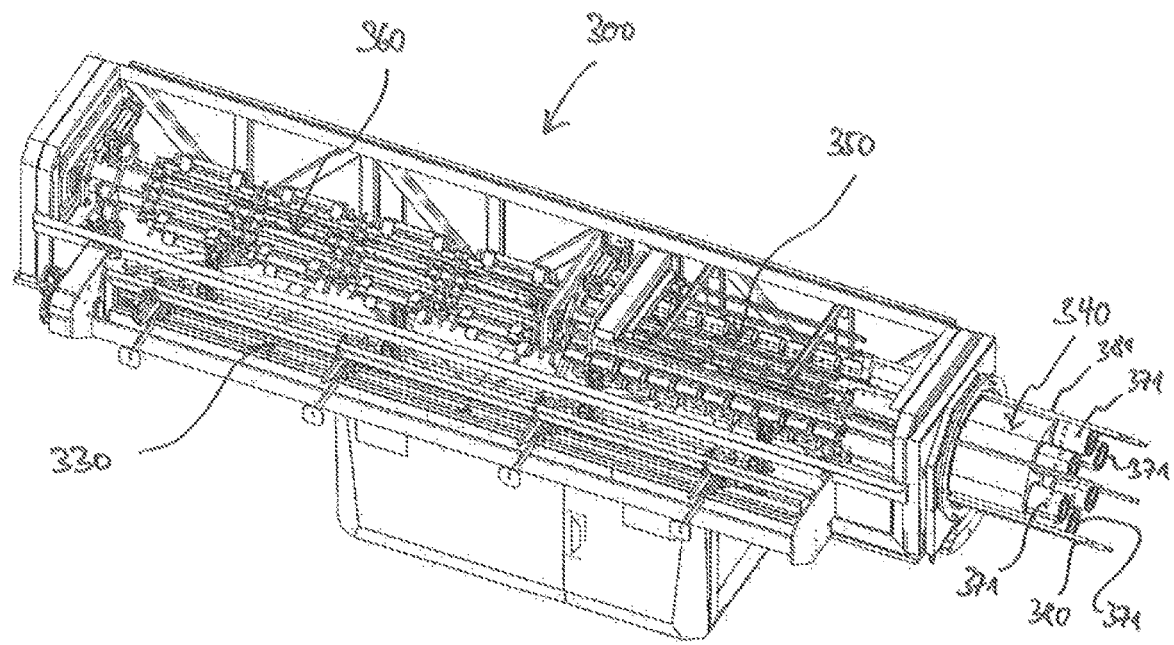
Figure 3C:
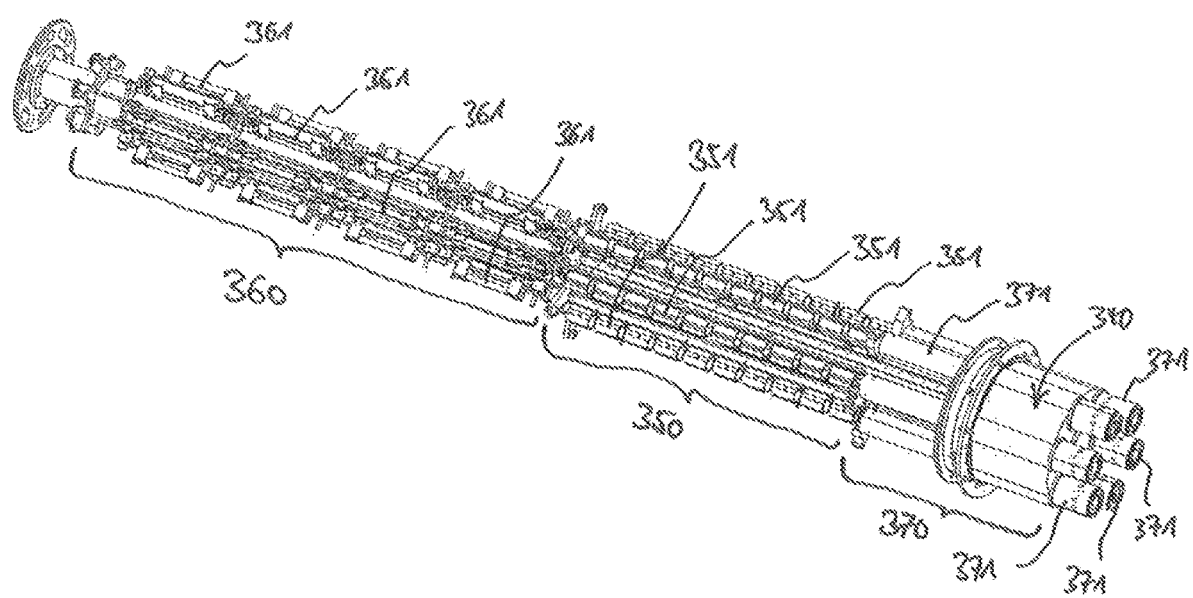

FIGS. 3A to 3C exemplary illustrate schematic perspective views of a bar loader 300 for use at a multi-spindle turning machine 100 and of parts thereof. Such bar loader 300 may exemplarily be used at any of the machine tools as described herein.

FIG. 3A exemplary illustrates the bar loader 300 with a housing 310 and a stand 320. Through an opening on a side of the housing 310, the bar loader includes a bar receiving portion 330 for receiving (being supplied) with unprocessed bars, rods or other elongated workpieces to be machined at the multi-spindle turning machine 100. Such elongated workpieces may have round profiles of various widths or other profiles, such as cornered profiles such as e.g. hexagonal cross-sectional profiles.

On one side of the bar loader 300, a turret fixture body 340 extends laterally from the bar loader 300. The turret fixture body 340 is rotatably supported around a longitudinal axis to be axially arranged with the rotational longitudinal axis of the turret body 20 of the multi-spindle turning machine 100. The turret fixture body 340 is configured to be fixed to the turret body 20 (e.g. by plural fixture rods 380) from a rear side of the multi-spindle turning machine 100 through a through hole of the back frame portion 13 so as to rotate together with the turret body 20 about the axially arranged longitudinal axes thereof.

Specifically, the turret body 20 and the turret fixture body 340 are exemplarily configured to be rigidly fixed to each other to rotate together about the common longitudinal axis. Accordingly, exemplarily the driven rotation of the guide system of the bar loader supported by the turret fixture body 340 is performed by mechanical connection of the turret fixture body 340 with the rear side of the turret body 20 through plural mechanical connections (e.g. by plural fixture rods 380) working on the external diameter of a rear flange of the machine. This mechanical connection of the turret fixture body 340 with the rear side of the turret body 20 assures the proper angular synchronisms with the spindles in the turret body 20 itself. Accordingly, the rotation of the bar loader guide system and the turret fixture body 340 of the bar loader 300 is exemplarily performed by the torque motor described below.

FIG. 3B exemplarily illustrates the bar loader 300 of FIG. 3A without housing 310 having an inner guide system, which is exemplarily shown in FIG. 3C.

The bar loader guide system as a whole is, together with the turret fixture body 340, rotatably supported about the longitudinal axis of the turret fixture body 340 (longitudinal axis of the guide system), and the guide system includes a fixed guide portion 360, a slidable middle guide portion 350 and a slidable end guide portion 370, wherein each of the fixed guide portion 360, the slidable middle guide portion 350 and the slidable end guide portion 370 are, together, rotatably supported about the longitudinal axis of the turret fixture body 340 (longitudinal axis of the guide system).

Accordingly, when the turret body 20 of the multi-spindle turning machine 100 is rotated/indexed, the turret fixture body 340 of the bar loader 300, being fixed to the turret body 20 of the multi-spindle turning machine 100, rotates in a synchronous manner together with the turret body 20 of the multi-spindle turning machine 100, and the guide system including the fixed guide portion 360, the slidable middle guide portion 350 and the slidable end guide portion 370 is driven to be rotated together with the turret fixture body 340 of the bar loader 300 and the turret body 20 about the common longitudinal axis.

Preferably, the control of the driven rotation of the guide system is performed by driving rotation of the turret 20 by control from the numerical control apparatus (NC) and/or the programmable logic controller (PLC) of the multi-spindle turning machine 100. This has the advantage that the control of the rotation of the turret body 20 and the rotation of the guide system of the bar loader 300 is synchronously controlled.

In addition, preferably, the numerical control system of the multi-spindle turning machine 100 (including the NC and/or the PLC) may be communicably connected with the bar loader's control system according to a master/slave relationship. This has the advantage that the numerical control apparatus (NC) and/or the PLC of the machine is enabled to manage directly plural or all of the functionalities of the bar loader (e.g. the machine is the "master", and the bar loader is the "slave"). Functionalities of the bar loader system may include at least one of: the selection and lifting of a new bar from a bar storage area into the guide system of the bar loader, the introduction of a new bar into a bar loader channel of the guide system, pushing of the bar for feeding new raw material for machining process (e.g. after receiving a specific signal, exemplarily indicating that a spindle collet is opened), and handling of a bar remnant.

The fixed guide portion 360 of the bar loader 300 exemplarily has plural longitudinally arranged rows of fixed bar guide portions 361 arranged around the longitudinal axis, each longitudinally arranged row of fixed bar guide portions 361 being provided for receiving a bar/elongated workpiece for a respective one of the workpiece spindles 30 of the multi-spindle turning machine 100 so that the number of longitudinally arranged rows of fixed bar guide portions 361 exemplarily is the same as the number of workpiece spindles 30 of the multi-spindle turning machine 100, exemplarily at same angular distances corresponding to the angular distances of the workpiece spindles 30 of the multi-spindle turning machine 100 arranged on the turret body 20.

The slidable middle guide portion 350 exemplarily has plural longitudinally arranged rows of slidable bar guide portions 351 arranged around the longitudinal axis, each longitudinally arranged row of slidable bar guide portions 351 being provided for receiving a bar/elongated workpiece for a respective one of the workpiece spindles 30 of the multi-spindle turning machine 100 so that the number of longitudinally arranged rows of slidable bar guide portions 351 exemplarily is the same as the number of workpiece spindles 30 of the multi-spindle turning machine 100, at same angular distances corresponding to the angular distances of the workpiece spindles 30 of the multi-spindle turning machine 100 arranged on the turret body 20.

Each longitudinally arranged row of slidable bar guide portions 351 of the slidable middle guide portion 350 is exemplarily associated with a respective longitudinally arranged row of fixed bar guide portions 361 of the fixed guide portion 360, and the respective slidable bar guide portions 351 of a certain row are axially arranged with its associated fixed bar guide portions 361 of an associated row in parallel with the longitudinal direction, so that the respective slidable bar guide portions 351 with its associated fixed bar guide portions 361 of associated rows are configured to simultaneously receive a bar/elongated workpiece supplied through the bar receiving portion 330.

Accordingly, both of the slidable bar guide portions 351 with its associated fixed bar guide portions 361 can be actuated to laterally open for laterally receiving the same bar/elongated workpiece supplied through the bar receiving portion 330, and then to be actuated to be laterally closed for enclosing the bar and providing a longitudinally extending guide channel for the respective received bar.

A feeding mechanism of the bar loader may per provided to be configured to feed bars/elongated workpieces, received in the slidable bar guide portions 351 with its associated fixed bar guide portions 361, in the longitudinal direction towards the slidable end guide portion 370 as well as towards and to the turret body 20 and the respective spindles 30.

The slidable end guide portion 370 has plural slidable bar guide portions 371 arranged around the longitudinal axis, each slidable bar guide portion 371 being provided for receiving a bar/elongated workpiece for a respective one of the workpiece spindles 30 of the multi-spindle turning machine 100 so that the number of slidable bar guide portions 371 exemplarily is the same as the number of workpiece spindles 30 of the multi-spindle turning machine 100, exemplarily at same angular distances corresponding to the angular distances of the workpiece spindles 30 of the multi-spindle turning machine 100 arranged on the turret body 20.

Each slidable bar guide portion 371 of the slidable end guide portion 370 is exemplarily associated with a respective row of slidable bar guide portions 351 of the slidable middle guide portion 350, and the respective slidable bar guide portion 371 is axially arranged with its associated row of slidable bar guide portions 351 in parallel with the longitudinal direction, so that the respective slidable bar guide portion 371 with its associated respective slidable bar guide portions 351 are configured to simultaneously guide a bar/elongated workpiece, when the respective bar/elongated workpiece is fed from the fixed guide portion 360 towards the slidable end guide portion 370 and the turret body 20.

In addition, each slidable bar guide portion 371 of the slidable end guide portion 370 longitudinally extends though the turret fixture body 340 of the bar loader 300, being fixed to the turret body 20 of the multi-spindle turning machine 100, so as to extend through the openings 26 of the back end portion 21 of the turret body 20 of the multi-spindle turning machine 100, so that each slidable bar guide portion 371 may be connected or fixed to a respective spindle body 32 of a respective workpiece spindle 30, e.g. by one or more connection elements (e.g. connection rods or the like), preferably one or more per spindle, as exemplarily shown in FIGS. 3A and 3B (connection elements 380).

When the respective bar/elongated workpiece is fed through the respective slidable bar guide portion 371 to extend into the connected spindle body 32 of a respective workpiece spindle 30, another optional feeding mechanism may be provided in the spindle body 32 of a respective workpiece spindle 30, so that the slidable bar guide portions 351 and 371 may be provided without another feeding mechanism, and the slidable bar guide portions 351 and 371 may preferably provide a guide channel providing guiding support for long bars or other elongated workpieces.

Exemplarily, contrary to the fixed bar guide portion 361 of the fixed guide portion 360, each slidable bar guide portion 371 (e.g. together with its respective associated slidable bar guide portions 351) is exemplarily configured to longitudinally slide together with the longitudinal movement of the respective workpiece spindle 30 in the longitudinal Z-direction.

Specifically, since the workpiece spindles 30 are configured to be driven independently from each other in the longitudinal Z-direction, each of the slidable bar guide portions 371 (e.g. with its respective associated slidable bar guide portion 351) is adapted to longitudinally slide independent of the other slidable bar guide portions 371 (e.g. with its respective associated slidable bar guide portion 351).

This has the advantage that the bar loader 300 additionally provides a reliable and accurate guiding support for long bars or other elongated workpieces, which gives constant guiding support even when the workpiece spindles 30 are driven in the Z-direction.

FIGS. 4A to 4E exemplary illustrate further schematic perspective views of inner parts of the bar loader 300 of FIGS. 3A to 3C.

In the region of the fixed guide portion 360 of the bar loader 300 exemplarily there are provided the plural fixed bar guide portions 361 in each longitudinally arranged row. Exemplarily, four separate fixed bar guide portions 361 are arranged axially with respect to each other in each longitudinally arranged row along and in parallel to the longitudinal direction of a longitudinally extending rotating body 341 of the turret fixture body 340.

The rotating body 341 is arranged so as to rotate around its longitudinal axis which can be axially arranged with the longitudinal turret axis of the turret body 20 of the machine tool 100.

The plural fixed bar guide portions 361 which are arranged axially with respect to each other in each longitudinally arranged row together form a fixed guide channel portion of a workpiece guide channel assembly. Since the number of workpiece spindles 30 is six in this example and a respective fixed guide channel portion and workpiece guide channel assembly is provided for each of the workpiece spindles 30, exemplarily there are six groups (longitudinally arranged rows) of fixed bar guide portions 361 arranged axially with respect to each other. These groups (rows) of fixed bar guide portions 361 are arranged around the rotating body 341 so that each group (row) of fixed bar guide portions 361 is arranged axially with respect to a respective spindle axis of one of the spindles 30.

Accordingly, the fixed guide portion 360 of the bar loader 300 exemplarily has a respective fixed guide channel portion of a respective workpiece guide channel assembly for each respective spindle axis of one of the spindles 30.

In the region of the slidable middle guide portion 350 of the bar loader 300 exemplarily there are provided the plural slidable bar guide portions 351 in each longitudinally arranged row. Exemplarily, plural separate slidable bar guide portions 351 are arranged in each longitudinally arranged row axially with respect to each other along and in parallel to the longitudinal direction of a longitudinally extending rotating body 341 of the turret fixture body.

The plural slidable bar guide portions 351 which are arranged axially with respect to each other in each longitudinally arranged row together form a slidable guide channel portion of a workpiece guide channel assembly. Since the number of workpiece spindles 30 is six in this example and a respective slidable guide channel portion and workpiece guide channel assembly is provided for each of the workpiece spindles 30, exemplarily there are six groups (longitudinally arranged rows) of slidable bar guide portions 351 arranged axially with respect to each other. These groups (rows) of slidable bar guide portions 351 are arranged around the rotating body 341 so that each group (row) of slidable bar guide portions 351 is arranged axially with respect to a respective spindle axis of one of the spindles 30.

Accordingly, the slidable middle guide portion 350 of the bar loader 300 exemplarily has a respective slidable guide channel portion of a respective workpiece guide channel assembly for each respective spindle axis of one of the spindles 30.

Furthermore, the respective slidable guide channel portion of a respective workpiece guide channel assembly is configured to move in the longitudinal direction (Z-direction) together with its respective associated workpiece spindle 30. It is to be noted that the slidable guide channel portions can move independently from each other since also the workpiece spindles 30 can move independently from each other in the longitudinal direction.

In the region of the slidable end guide portion 370 of the bar loader 300 exemplarily there are provided the plural slidable bar guide portions 371. Exemplarily, the slidable bar guide portions 371 are exemplarily embodied by slidable guide tubes (see description below). Each slidable bar guide portion 371 exemplarily embodied by a respective guide tube forms a slidable guide channel portion of a workpiece guide channel assembly.

Since the number of workpiece spindles 30 is six in this example and a respective slidable guide channel portion and workpiece guide channel assembly is provided for each of the workpiece spindles 30, exemplarily there are six slidable bar guide portions 371, and the slidable bar guide portions 371 are arranged around the rotating body 341 so that each slidable bar guide portion 371 is arranged axially with respect to a respective spindle axis of one of the spindles 30.

Accordingly, the slidable end guide portion 370 of the bar loader 300 exemplarily has a respective slidable guide channel portion of a respective workpiece guide channel assembly for each respective spindle axis of one of the spindles 30.

In view of the above, the rotating body 341 supports a plurality of workpiece guide channel assemblies for each respective spindle axis of one of the spindles 30, and each workpiece guide channel assembly exemplarily includes plural fixed bar guide portions 361 arranged axially with respect to the respective spindle axis of the associated workpiece spindle 30, plural slidable bar guide portions 351 arranged axially with respect to the respective spindle axis of the associated workpiece spindle 30 and a respective slidable bar guide portion 371 being arranged axially with respect to the respective spindle axis of the associated workpiece spindle 30.

The plural fixed bar guide portions 361 of a respective workpiece guide channel assembly are exemplarily fixed to the rotating body 341 and form a fixed guide channel portion for receiving an elongated workpiece/bar.

The plural slidable bar guide portions 351 of a respective workpiece guide channel assembly are exemplarily arranged on the rotating body 341 so as to be movable into the longitudinal direction of the rotating body 341 and form a slidable guide channel portion for receiving an elongated workpiece/bar.

The slidable bar guide portion 371 of a respective workpiece guide channel assembly is exemplarily arranged on the rotating body 341 so as to be movable into the longitudinal direction of the rotating body 341 and forms another slidable guide channel portion for receiving an elongated workpiece/bar. As previously mentioned, the slidable bar guide portions 371 are exemplarily embodied as guide tubes.

Figure 4A:
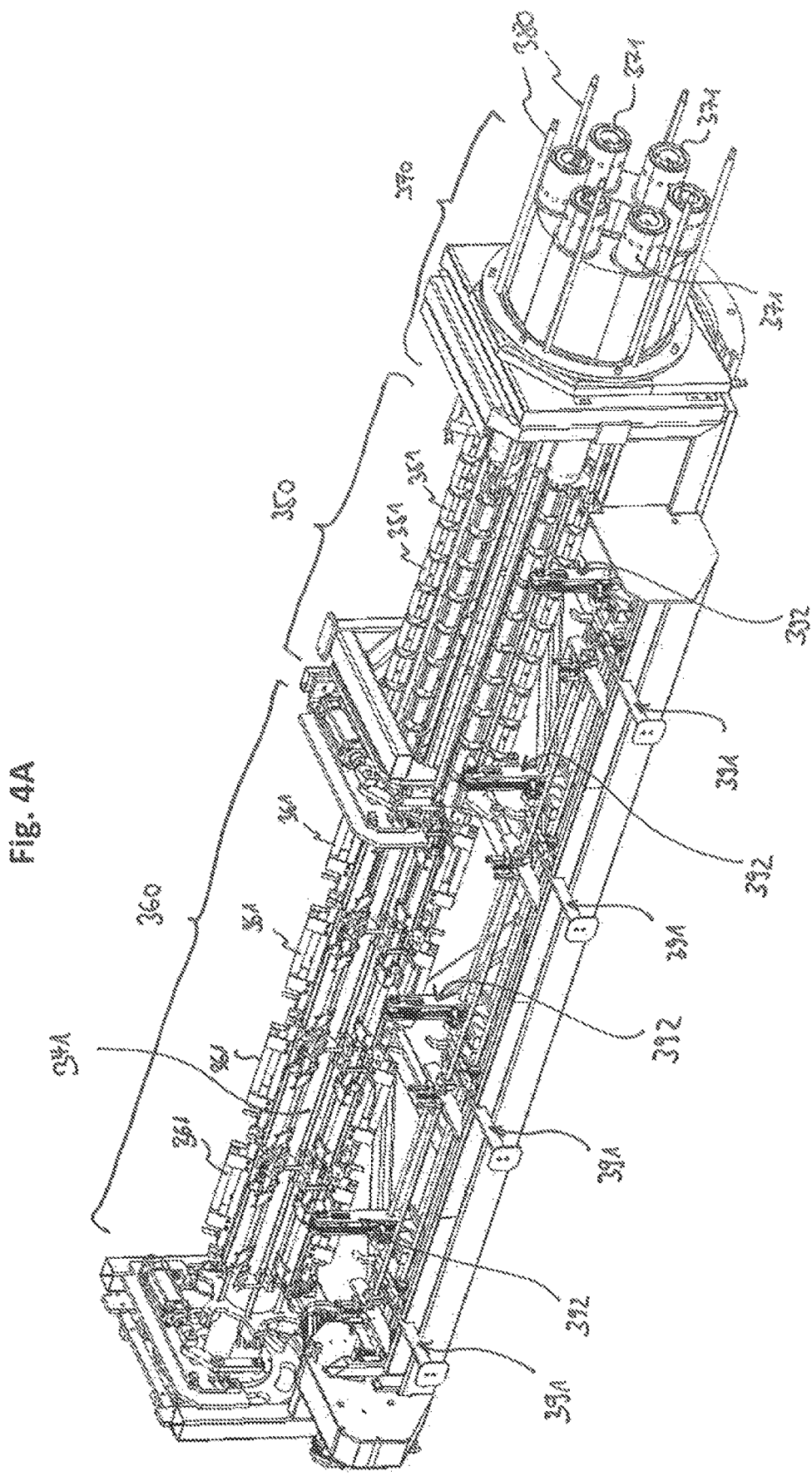
Figure 4B:
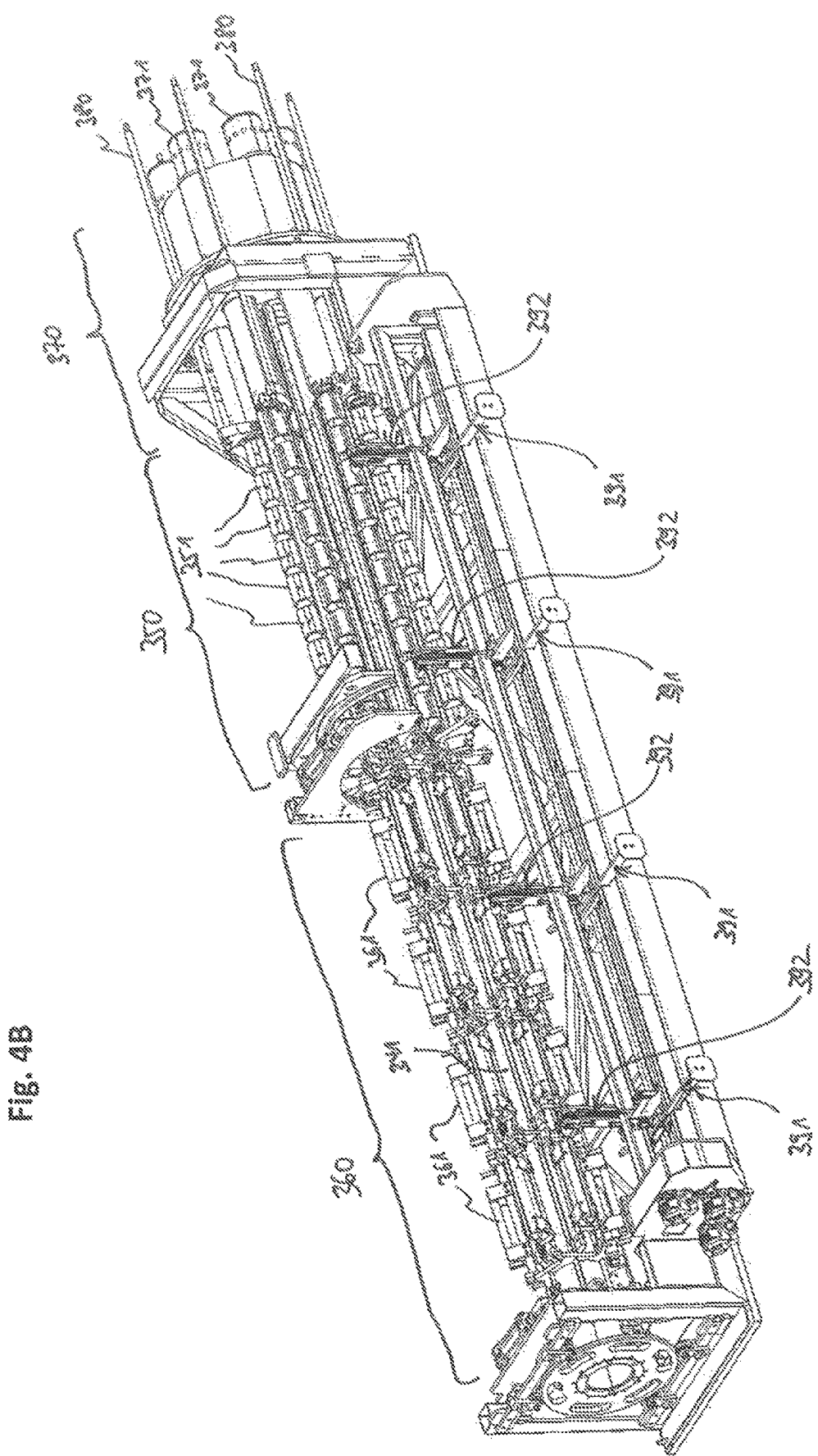
Figure 4C:
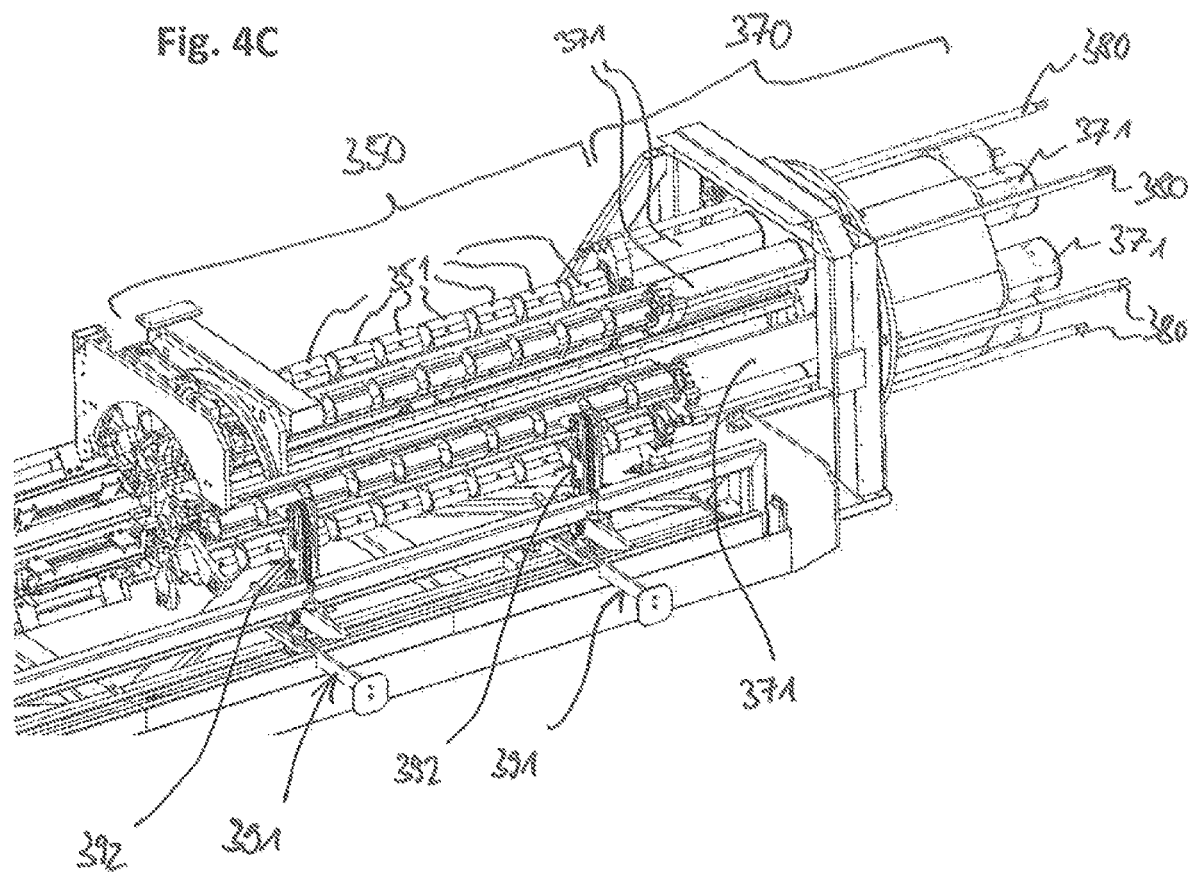
Figure 4D:
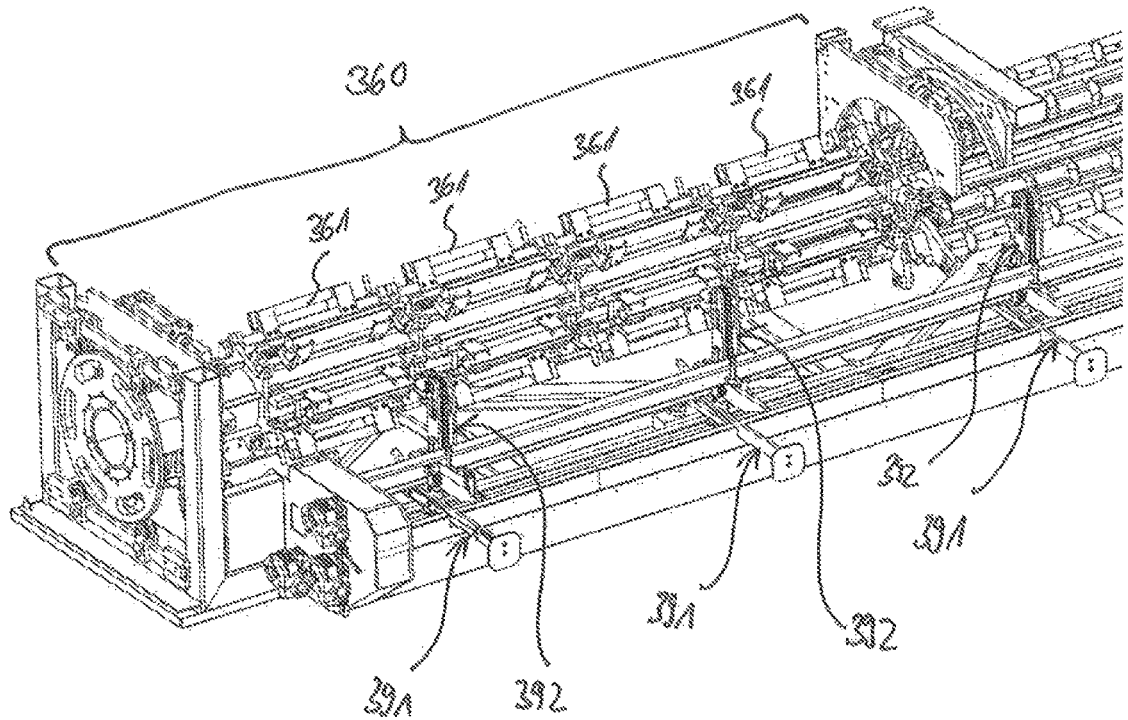

Furthermore, FIGS. 4A to 4C exemplarily illustrate plural storage portion elements 391 configured to store a plurality of elongated workpieces/bars together as a storage portion. Also, there are exemplarily provided plural transfer devices 392 configured to transfer an elongated workpiece/bar from the storage portion elements 391 to one of the workpiece guide channel assemblies.

FIG. 4E exemplarily shows a detailed view of one of the storage portion elements 391 with an associated stopper element 394 and a transfer device 392 which includes a support portion 392a which exemplarily supports a recirculating chain 392b and a transfer element 392c attached to a position of the recirculating chain 392b.

By driving the movement of the recirculating chain 392b supported by the support portion 392a, to move the transfer element 392c from the bottom side to the top side of the support portion 392a, the transfer element 392c can be brought into engagement with a closest elongated workpiece/bar stored on the storage portion elements 391 and by further moving the transfer element 392c upward, the transfer element 392c lifts the closest elongated workpiece/bar stored on the storage portions 391 and transfers it to a one of the workpiece guide channel assemblies which is currently positioned in a loading position, see e.g. the fixed bar guide portion 361 exemplarily shown in FIG. 4E.

In addition to the storage portion elements 391, FIG. 4E exemplarily shows a guiding element 393 above the respective storage portion element 391 and extending in parallel with the storage portion elements 391. The height of the guiding element 393 above the respective storage portion element 391 is adjustable by a gear mechanism having a vertically arranged toothed rack and associated pinion to adapt the transfer device for different diameters of elongated workpieces/bars.

The guiding element 393 has a function to restrict that multiple bars (elongated workpieces) may be stored on top of each other, so as to force a single row of bars/elongated workpieces arranged parallel to each other and parallel to the longitudinal direction of the rotating body 341 and the respective workpiece guide channel assemblies.

Also, an inclination angle of the storage portion elements 391 may be adjustable to be adapted to different shapes of cross-sections of the elongated workpieces/bars. For example, for workpieces having round or even circular cross-sectional profiles, a lower inclination angle may be set, and for workpieces having edged profiles such as hexagonal profiles, a higher inclination angle may be set.

As previously mentioned, the transfer devices 392 are configured to transfer an elongated workpiece/bar from the storage portion formed by the storage portion elements 391 to a respective workpiece guide channel assemblies in a loading position. In order to load a bar/elongated workpiece to another workpiece guide channel assembly, the rotating body 341 is rotated to position the other workpiece guide channel assembly in that same loading position.

It is to be noted that the loading position may also be a feeding position of the workpiece guide channel assembly in which the elongated workpiece/bar is longitudinally supplied (fed) to the associated workpiece spindle 30. However, such feeding position may also be arranged at another angular position of the rotating body 341 so that the rotating body 341 is rotated, after an elongated workpiece/bar has been loaded at the loading position to a respective workpiece guide channel assembly, to a position in which the respective workpiece guide channel assembly is positioned in the feeding position.

In yet further exemplary embodiments, the bar loader 300 may also be configured such that each workpiece guide channel assembly is configured to feed the elongated workpiece/bar to the respective associated workpiece spindle 30 in plural or even any positions of the rotating body 341.

In the above example, the slidable bar guide portions 351 of the slidable middle guide portion 350 of the bar loader 300 and the fixed bar guide portions 361 of the fixed guide portion 360 of the bar loader 300 may be configured to be opened laterally so as to be able to receive a bar/elongated workpiece at the loading position. Then, when the bar/elongated workpiece is loaded to the fixed bar guide portions 361 and slidable bar guide portions 351 of a respective workpiece guide channel assembly, the slidable bar guide portions 351 and the fixed bar guide portions 361 of the respective workpiece guide channel assembly may be configured to be closed again to hold and guide the bar/elongated workpiece in a commonly formed workpiece guide channel.

When the bar/elongated workpiece is the supplied or fed to the respective associated spindle 30, the bar/elongated workpiece will then be clamped at the workpiece spindle. However, the bar/elongated workpiece is then advantageously still guided in the formed workpiece guide channel of a workpiece guide channel assembly, and especially in the channel portions formed by the slidable bar guide portions 351 and the slidable bar guide portion 371 of the slidable guide portions 350 and 370, and the respective slidable bar guide portions 351 and the slidable bar guide portion 371 of the respective workpiece guide channel assembly can move in the longitudinal direction (Z-direction) together with the associated workpiece spindle 30 during the machining operations.

Accordingly, due to the advantageous sliding portions of the respective workpiece guide channel assembly, the workpieces/bars can be reliably and accurately be guided by the respective slidable bar guide portions 351 and the slidable bar guide portion 371 of the respective workpiece guide channel assembly which move together with the respective workpiece spindle 30.

For this purpose, the respective slidable portions of the workpiece guide channel assemblies are preferably respectively fixed, e.g. by fixing rods 380, to the respective associated workpiece spindles 30. For example, each slidable bar guide portion 371 is preferably fixed to its associated workpiece spindle 30 by a respective fixing rod 380. In addition, exemplarily, each fixing rod 380 may additionally be slidably fixed to the turret body 20 so that the rods 380 can slide with respect to the turret body 20 in the longitudinal direction (e.g. by extending through respective through holes of the back end portion 21 of the turret body 20, and the rods 380 rotate together with the turret body 20 about the turret axis (longitudinal axis of the turret body 20), thereby preferably furthermore transferring the driven rotation of the turret body 20 to the rotating body 341 of the bar loader 300.

Figure 5A:
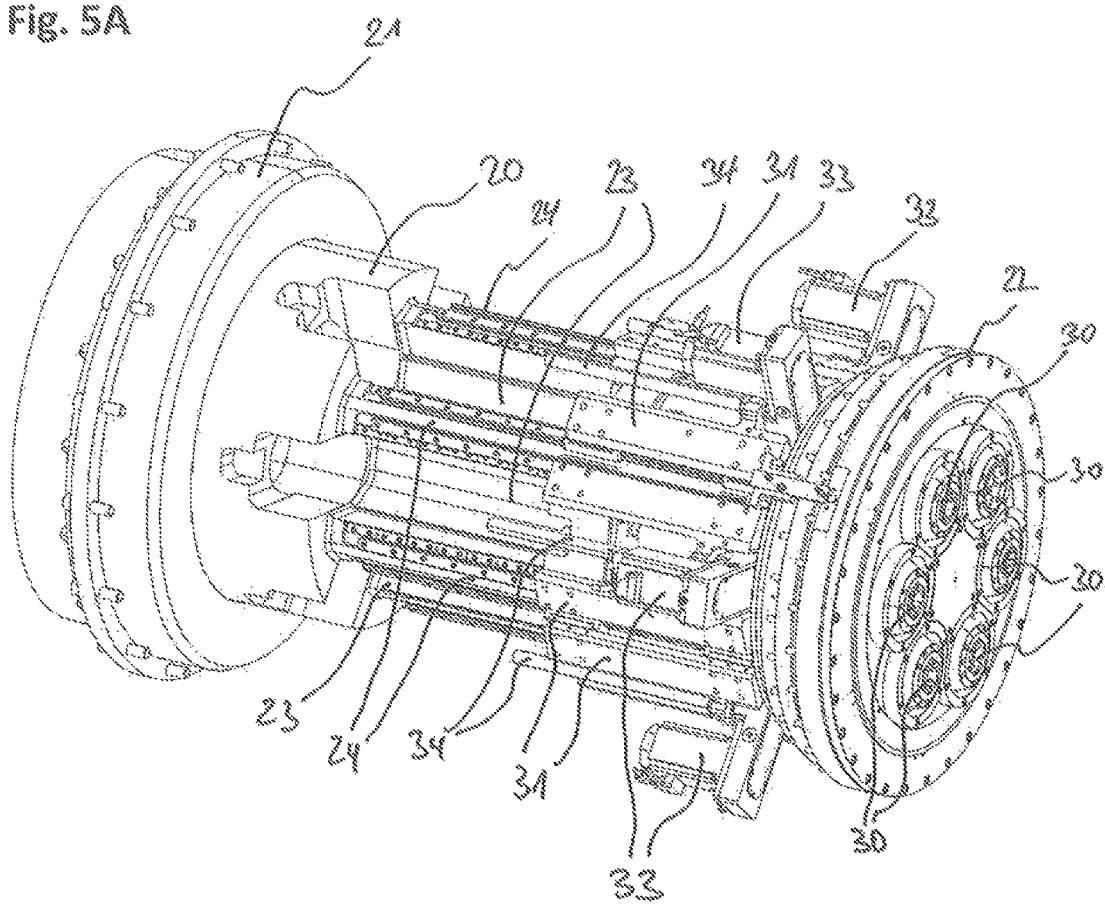
FIGS. 5A and 5B exemplarily illustrate schematic perspective views of a drum of a multi-spindle turning machine according to an exemplary embodiment.
Figure 5B:
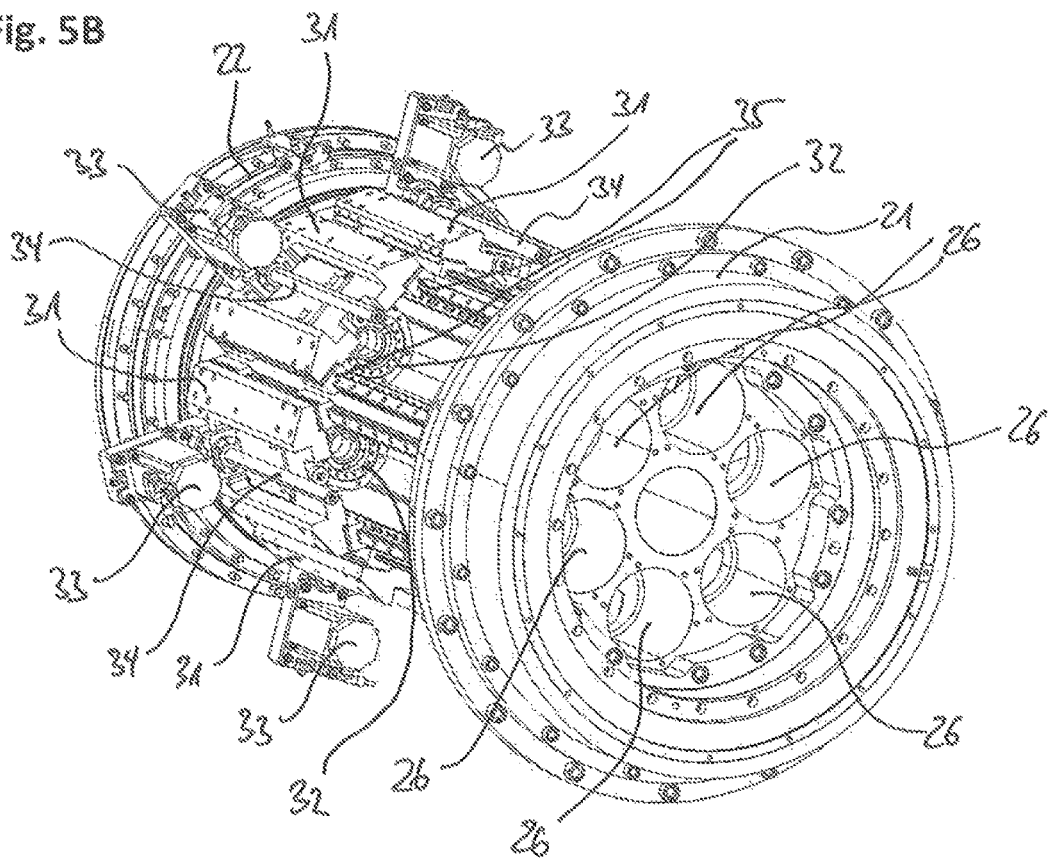

FIGS. 5A and 5B exemplarily illustrate schematic perspective views of a drum/turret body 20 of the multi-spindle turning machine 100 (e.g. according to FIGS. 1 and 2).

The turret body 20 exemplarily has attached a front end portion 22 and a back end portion 21 which are the portions respectively supported rotatably by the front frame portion 12 and the back frame portion 13 of the machine frame 10. The back end portion 21 attached to the turret body 20 includes openings 26 through which each of the spindles 30 may be supplied with workpieces (such as e.g. bars) from a backside of the multi-spindle turning machine 100, e.g. by the bar loader 300 as described above and below.

The turret body 20 has, for each of the workpiece spindles 30, a respective longitudinal groove 23 extending longitudinally (Z-direction/longitudinal direction of the turret body 20) from the front end portion 22 to the back end portion 21. The longitudinal grooves 23 are exemplarily opened to the outer circumferential side of the turret body 20 so as to open to the space between the front frame portion 12 and the back frame portion 13 of the machine frame 10.

Exemplarily, the turret body 20 has, between each pair of adjacent grooves 23, a respective ledge portion 24 extending longitudinally (Z-direction/longitudinal direction of the turret body 20) from the front end portion 22 to the back end portion 21. Exemplarily, the number of grooves 23 is the same as the number of longitudinal ledge portions 24.

The spindle bodies 32 of the workpiece spindles 30 are exemplarily guided in the respective longitudinal grooves 23 and supported by the respective spindle slide 31 which is arranged at an outer circumferential side of the turret body 20. Specifically, each spindle slide 31 is exemplarily guided, with guide elements 35, on the longitudinal ledge portions 24 formed on the sides of the respective grooves 23.

Such configuration has the advantage that the slides 31 and their drive mechanisms may be provided outside on an outer circumferential side of the turret body 20, so that the turret body 20 can be made efficiently compact and lightweight, since the radiating profile of the turret body 20 having the groove-ledge arrangement gives very high stability and stiffness even at relatively low ledge thickness, and the spindles can be arranged more compactly since the spindle slides and their drive mechanisms can be arranged circumferentially outside of the turret body 20, efficiently using the space between the front and back frame portions 12 and 13, and the size of the slides and their drive mechanism does not need to be compactified, even though the turret body 20 is very compact.

Exemplarily, the slide drive mechanism includes a thread shaft 34 driven by a drive 33 (drive motor). In FIGS. 5A and 5B, the drive 33 is exemplarily not mounted to the spindle slide 31 but is mounted to the front end portion 22 or a front portion of the turret body 20.

In FIGS. 5A and 5B, when rotatively driving the thread shaft 34 by way of the drive 33, the respective spindle slide 31 is exemplarily driven in the longitudinal direction (Z-direction, axially with respect to the respective spindle axis) along the guiding ledges 24 so as to move the spindle body 32 of the respective workpiece spindle 30 in the longitudinal Z-direction (e.g. towards or away from the workspace) within the respective longitudinal groove 23.

However, in other exemplary embodiments the drive 33 may also be mounted to the spindle slides 31 or to a mount structure of (or attached to) the back portion the turret body 20.

As exemplarily described above, a spindle slide mechanism of the machine tool 100 on the turret body 20 includes, for each of the spindles 30, the respective spindle slide 31 which supports the respective spindle body 32 which may include an integrated spindle drive (e.g. a built-in spindle motor) and may further include an actuated locking mechanism (e.g. a mechanically, hydraulically, pneumatically and/or electrically actuated locking mechanism) to automatically lock received workpieces (such as e.g. bars) in the spindle to rotatively drive the received and locked workpieces by the spindle drive.

For example, the spindle body 32 of the respective workpiece spindles 30 may further include a clamping unit configured to fixedly clamp a bar or other elongated workpiece received in the respective workpiece spindle 30, wherein the clamping unit exemplarily may include a hydraulic actuator for actuating the clamping and the unclamping of a bar or other elongated workpiece. In other exemplary embodiments, the clamping unit can be actuated by a pneumatic, mechanical, and/or electrical actuator.

The turret body 20 exemplarily includes the front end portion 22 and the back end portion 21 which are the portions respectively supported rotatably by the front frame portion 12 and the back frame portion 13 of the machine frame 10. The front end portion 22 of the turret body 20 includes openings to receive the workpiece spindles 30 (specifically the front portions thereof), and the back end portion 21 of the turret body 20 includes openings 26 through which each of the spindles 30 may be supplied with workpieces (such as e.g. bars) from a backside of the multi-spindle turning machine 100, e.g. by the bar loader 300.

This has the advantage that workpieces, such as e.g. long bars, do not need to be inserted from a workspace side but may be supplied/inserted by a bar loader or bar feeder from a backside of the machine, where more space may be available. Then, workpieces only may need to be removed after machining from a front side at the working space, when such workpieces may be easier to be handled, e.g. automatically by external handling robots or additionally integrated robots.

Exemplarily, the turret body 20 does not have through holes from the front side to the backside of the turret body 20 for each of the spindles 30, as typically known from known multi-spindle turning machines, but the turret body 20 has, for each of the workpiece spindles 30, a respective longitudinal groove 23 extending longitudinally (Z-direction/longitudinal direction of the turret body 20) from the front end portion 22 of the turret body 20 to the back end portion 21 of the turret body 20. The longitudinal grooves 23 are exemplarily opened to the outer circumferential side of the turret body 20 so as to open to the space between the front frame portion 12 and the back frame portion 13 of the machine frame 10.

As exemplarily described above, a bar loader 300 can be arranged on the rear side of the multi-spindle turning machine 100 facing the back frame portion 13 of the machine frame 10, such that the bar loader 300 is being configured to supply elongated workpieces, e.g. bars (e.g. bars with a round or circular cross section or bars with an angled cross section such as e.g. a hexagonal cross section), from the rear side into the respective workpiece spindles 30 through the holes 26 formed in the back end portion 21 of the turret body 20 (see e.g. FIG. 5B).

As previously exemplarily described, the turret body 22 is rotatably supported about the longitudinal rotational axis, in that a back-side end portion 21 of the turret body 20 (e.g. made as one piece with the turret body 20 or being attached to the turret body 20 at the back side) is rotatably supported at the back frame portion 13 of the machine frame 10 and a front-side end portion 22 of the turret body 20 (e.g. made as one piece with the turret body 20 or being attached to the turret body 20 at the front side facing the workspace) is rotatably supported at the front frame portion 12 of the machine frame 10.

For driving the rotational movement of the turret body 20, exemplarily a torque motor may be provided at the back frame portion 13 of the machine frame 10. The use of a torque motor has an advantage that the rotation between machining positions of the workpiece spindles 30 can be controlled efficiently, reliably, accurately and with quick response time by the numerical controller of the machine tool controlling the torque motor as the drive for the rotational movement of the turret body 20.

Such torque motor may include a rotor and a stator, wherein the rotor can be mounted on a circumferential portion of the back-side end portion 21 of the turret body 20, and the stator may be mounted to the back frame portion 13 of the machine frame 10. The torque motor can be configured to drive the rotational movement of the turret body 20 for movement of the workpiece spindles 30 between machining positions of the workpiece spindles 30.

By including the torque motor into the rotatable support of the end portion of the turret body 20, a compact and efficient, power saving drive mechanism can advantageously be provided. Furthermore, any potential heat generated potentially by the drive mechanism is advantageously located far and separate from the front frame portion 12 and the front end portion 22, in that the torque motor is separated by the air space between the frame portions 12 and 13 and is located on the opposite end side portion of the turret body 20 with respect to the end side portion 22 of the turret body 20 facing the workspace.

Accordingly, an accuracy and precision of machining operations at the workspace side can be improved since the torque motor as potential heat source, which might affect accuracy by thermal effects, is located on the opposite end side of the turret body 20 so that thermal effects at the side facing the workspace close to the workpiece receiving portions of the workpiece spindles 30 and the tool post assemblies 40 are advantageously minimized, while at the same time having the efficient, accurate and direct driving mechanism provided by the torque motor.

To further enhance the accuracy of the machining operations and the movement control of the turret body 20, exemplarily, a positioning system may be circumferentially arranged around the front end portion of the turret body 20 facing the workspace at the position of the rotatable support of the front frame portion 12.

The positioning system exemplarily may include a circumferentially arranged absolute encoder for determining the rotational position of the turret body 20.

By detecting a rotational position of the turret body 20 by way of the position signal from the absolute encoder, the driving control of the torque motor can be based on accurate feedback-control to accurately and precisely drive the turret body 20 to the rotational position according to the intended machining position, for aligning the position of the workpiece spindles 30 with the respective tool post assemblies 40.

Since the positioning system can be provided at the front side of the turret body 10 at the front frame portion 12 facing directly the workspace and close to the tool post assemblies 40, the accuracy and precision of the positioning system is advantageously improved.

While using an absolute encoder is a very preferred exemplary embodiment, the present invention is not limited to the use of absolute encoders as positioning detecting device, and other positioning detecting devices may be used such as e.g. incremental encoders, e.g. measuring not the absolute position but the distance between the machining positions.

Furthermore, the positioning system exemplarily may include plural brake mechanisms (e.g. hydraulic, pneumatic and/or electric brakes) circumferentially arranged with respect to the front end portion of the turret body 20 facing the workspace at the position of the rotatable support of the front frame portion 12.

Accordingly, when the rotational position of the turret body 20 by way of the position signal from the absolute encoder is detected to be accurately and precisely located at the intended machining position, the brake mechanisms (position locking system) are actuated to fix and lock the rotational position of the turret body 20 in said intended machining position during the machining phase.

In some preferred aspects, a controller may be provided for controlling a machining of one or more workpieces received at the plurality of workpiece spindles 30, when the workpiece spindles 30 are positioned at respective machining positions.

In some preferred aspects, the controller may be further configured to control the torque motor for controlling a rotational movement of the turret body 20 for indexing the workpiece spindles 30 between the respective machining positions and/or to control the position locking mechanism (brake mechanisms) for locking the rotational position of the workpiece spindles in the machining positions during the machining of the one or more workpieces.

Furthermore, the spindle body 32 of the respective workpiece spindles 30 may further include a clamping unit configured to fixedly clamp a bar or other elongated workpiece received in the respective workpiece spindle 30, wherein the clamping unit exemplarily includes a hydraulic actuator for actuating the clamping and the unclamping of a bar or other elongated workpiece. In other exemplary embodiments, the clamping unit can be actuated by a hydraulic, pneumatic, mechanical, and/or electrical actuator.

Figure 6A:
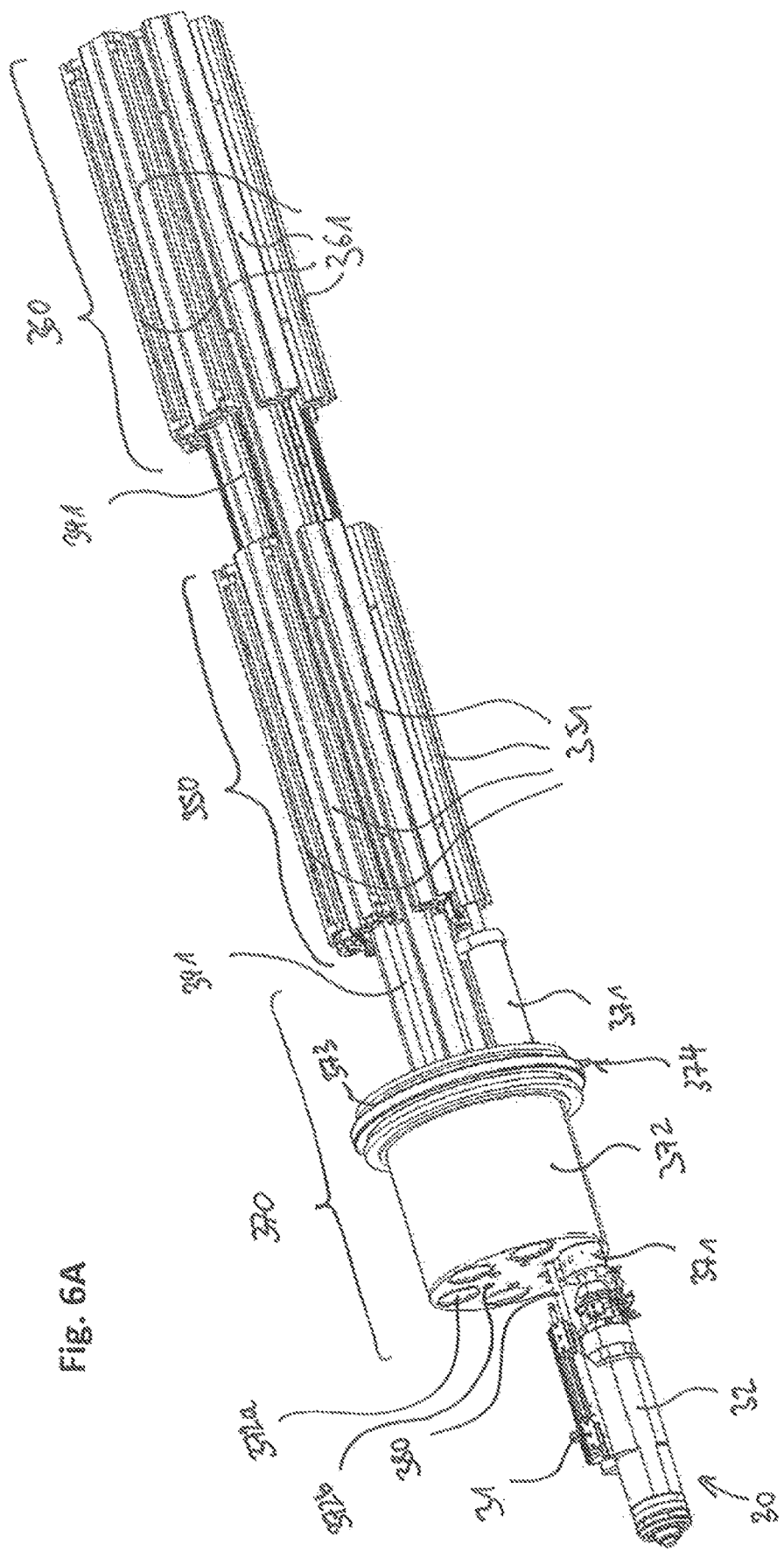
Figure 6C:
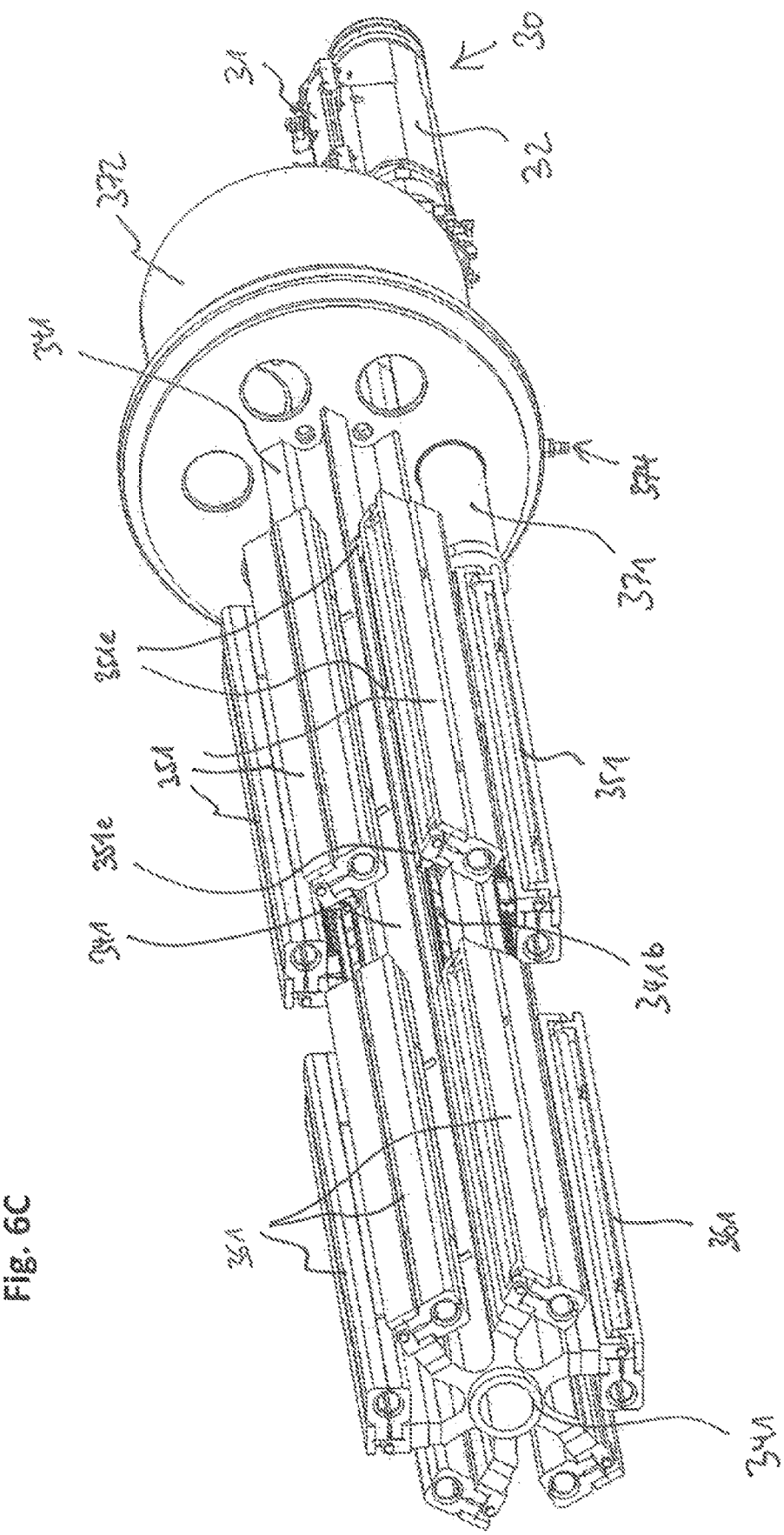

FIGS. 6A to 6C exemplary illustrate further schematic perspective views of inner parts of a bar loader 300 of another exemplary embodiment.

A difference between the above exemplary embodiments, the bar loader 300 of FIGS. 6A to 6C only has one fixed bar guide portion 361 and one slidable bar guide portion 351 per workpiece guide channel assembly, instead of segmented bar guide portions as exemplarily shown in FIGS. 4A to 4D.

In the region of the fixed guide portion 360 of the bar loader 300 exemplarily there are provided the plural fixed bar guide portions 361. Each of the plural fixed bar guide portions 361 is arranged in parallel to the longitudinal direction of a longitudinally extending rotating body 341 of the turret fixture body and forms a fixed guide channel portion of a respective workpiece guide channel assembly. Since the number of workpiece spindles 30 is six in this example and a respective fixed guide channel portion and workpiece guide channel assembly is provided for each of the workpiece spindles 30, exemplarily there are six fixed bar guide portions 361 arranged around the rotating body 341 so that each fixed bar guide portion 361 is arranged axially with respect to the respective spindle axis of its associated workpiece spindle 30.

Accordingly, the fixed guide portion 360 of the bar loader 300 exemplarily has a respective fixed guide channel portion of a respective workpiece guide channel assembly for each respective spindle axis of one of the spindles 30.

In the region of the slidable middle guide portion 350 of the bar loader 300 exemplarily there are provided the plural slidable bar guide portions 351. Each of the slidable bar guide portions 351 is arranged in parallel to the longitudinal direction of a longitudinally extending rotating body 341 of the turret fixture body 341 and forms a slidable guide channel portion of a workpiece guide channel assembly. Since the number of workpiece spindles 30 is six in this example and a respective slidable guide channel portion and workpiece guide channel assembly is provided for each of the workpiece spindles 30, exemplarily there are six slidable bar guide portions 351 arranged around the rotating body 341 so that each slidable bar guide portion 351 is arranged axially with respect to the respective spindle axis of its associated workpiece spindle 30.

Accordingly, the slidable middle guide portion 350 of the bar loader 300 exemplarily has a respective slidable guide channel portion of a respective workpiece guide channel assembly for each respective spindle axis of one of the spindles 30.

In the region of the slidable middle guide portion 350 of the bar loader 300 exemplarily there are provided the plural slidable bar guide portions 351. Exemplarily, plural separate slidable bar guide portions 351 are arranged axially with respect to each other along and in parallel to the longitudinal direction of a longitudinally extending rotating body 341 of the turret fixture body 340.

Furthermore, the respective slidable guide channel portion of a respective workpiece guide channel assembly is configured to move in the longitudinal direction (Z-direction) together with its respective associated workpiece spindle 30. It is to be noted that the slidable guide channel portions can move independently from each other since also the workpiece spindles 30 can move independently from each other in the longitudinal direction.

In the region of the slidable end guide portion 370 of the bar loader 300 exemplarily there are provided the plural slidable bar guide portions 371. Exemplarily, the slidable bar guide portions 371 are exemplarily embodied by slidable guide tubes (see description below). Each slidable bar guide portion 371 exemplarily embodied by a respective guide tube forms a slidable guide channel portion of a workpiece guide channel assembly.

Since the number of workpiece spindles 30 is six in this example and a respective slidable guide channel portion and workpiece guide channel assembly is provided for each of the workpiece spindles 30, exemplarily there are six slidable bar guide portions 371, and the slidable bar guide portions 371 are arranged around the rotating body 341 so that each slidable bar guide portion 371 is arranged axially with respect to a respective spindle axis of one of the spindles 30.

Accordingly, the slidable end guide portion 370 of the bar loader 300 exemplarily has a respective slidable guide channel portion of a respective workpiece guide channel assembly for each respective spindle axis of one of the spindles 30.

In view of the above, the rotating body 341 supports a plurality of workpiece guide channel assemblies for each respective spindle axis of one of the spindles 30, and each workpiece guide channel assembly exemplarily includes a respective fixed bar guide portion 361 extending axially with respect to the respective spindle axis of the associated workpiece spindle 30, a respective slidable bar guide portion 351 extending axially with respect to the respective spindle axis of the associated workpiece spindle 30, and a respective slidable bar guide portion 371 being arranged axially with respect to the respective spindle axis of the associated workpiece spindle 30.

The plural fixed bar guide portions 361 of the workpiece guide channel assemblies are exemplarily fixed to the rotating body 341 and form respective fixed guide channel portions.

The plural slidable bar guide portions 351 of the workpiece guide channel assemblies are exemplarily arranged on the rotating body 341 so as to be movable into the longitudinal direction of the rotating body 341 and form respective slidable guide channel portions.

As exemplarily shown in FIG. 6C, the slidable bar guide portions 351 are supported by carriages 351e which are configured to slide in the longitudinal direction on guides 341b which are arranged on the rotating body 341. For example, the carriages 351e may include recirculating ball bearing guides. On the other hand, the fixed bar guide portions 361 are fixed to the rotating body 341. Otherwise, the bar guide portions 351 and 361 of FIGS. 6A to 6C are similar, see e.g. FIG. 11.

The slidable bar guide portion 371 of a respective workpiece guide channel assembly is exemplarily arranged on the rotating body 341 so as to be movable into the longitudinal direction of the rotating body 341 and forms another slidable guide channel portion. As previously mentioned, the slidable bar guide portions 371 are exemplarily embodied as guide tubes.

Exemplarily, at an end of the rotating body 341 facing the machine tool side, a ring-shaped support body 373 is provided to rotatively support the rotating body 341 at the support structure of the housing 310 (see FIG. 3A). On an outer side of the support body 373 a hollow-cylinder-shaped pot body 372 is attached. Both of the support body 373 and the pot body 372 are rigidly fixed to the rotating body 341 to rotate with the rotating body 341.

An end face of the pot body 372 exemplarily has openings 372a through which the respective slidable bar guide portions 371 (e.g. a guide tube) extend, being movably in the longitudinal direction through the openings 372a. Furthermore, the end face of the pot body 372 exemplarily has through holes 372b through which the respective fixture rods 380 extend, being movably in the longitudinal direction through the openings 372b. Exemplarily only one slidable bar guide portion 371 with its associated fixture rod 380 is shown in FIGS. 6A to 6C.

Figure 7A:
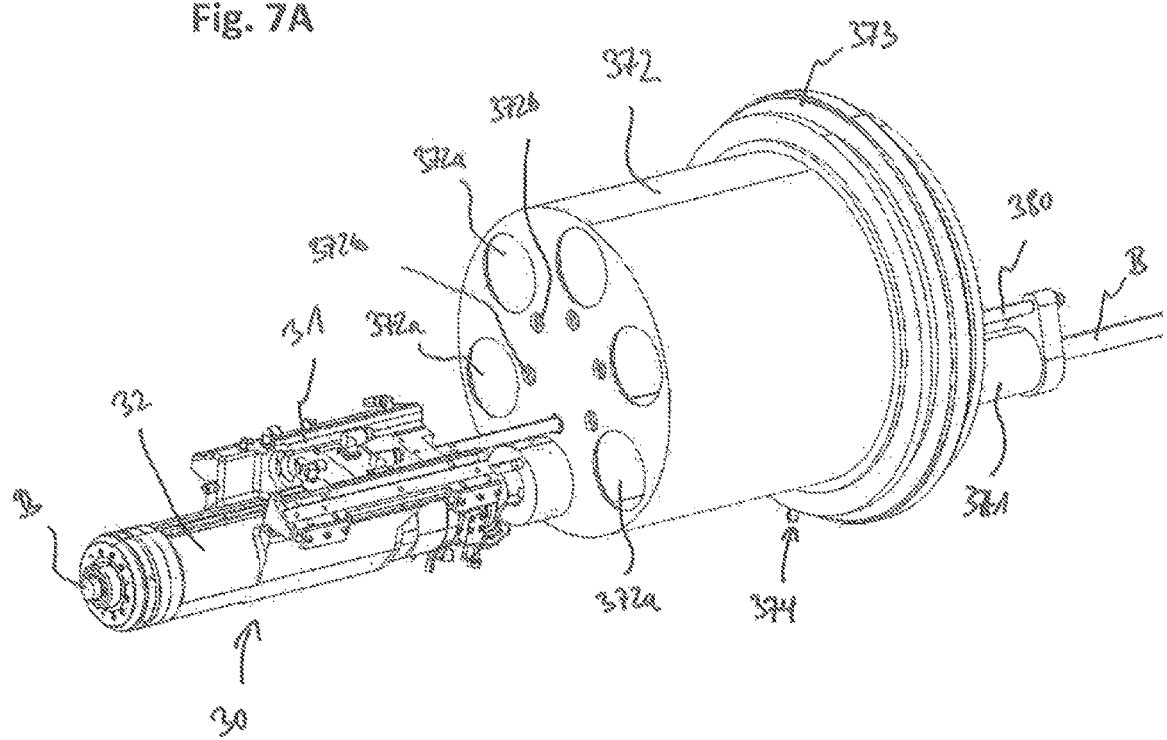
FIGS. 7A and 7B exemplary illustrate schematic perspective views of details of inner parts of a bar loader according to FIGS. 6A to 6C.
Figure 7B:
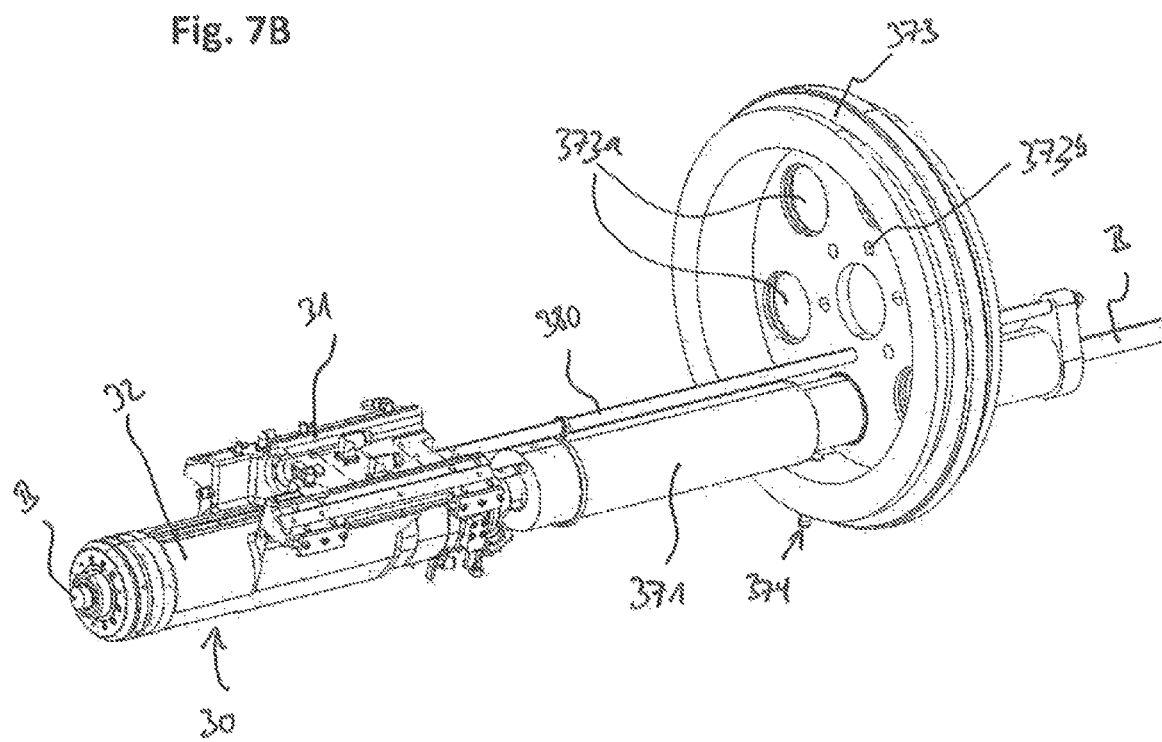

FIGS. 7A and 7B exemplary illustrate schematic perspective views of details of inner parts of a bar loader 300 according to FIGS. 6A to 6C.

The respective fixture rod 380 is exemplarily fixed, at one end thereof, to the spindle carriage 32 of the associated workpiece spindle 30 and with the other end to a fixing element which is exemplarily fixed to an end of the slidable bar guide portion 371 which is exemplarily facing away from the workpiece spindle 30.

FIGS. 7A and 7B further exemplarily show a bar B as elongated workpiece being received at the workpiece spindle 30. The bar B extends through the slidable bar guide portion 371 and is clamped within the spindle body 32 of the workpiece spindle 30 and extends out of the spindle 30 on a machining side. Furthermore, the bar B remains guided within the guide channel of the slidable bar guide portion 371 exemplarily embodied as a guide tube.

When the workpiece spindle 30 is moved in the longitudinal direction (Z-direction) in parallel with its spindle axis during the machining operations of machining a front end of the bar B, the slidable bar guide portion 371 fixed with the longitudinally extending fixture rod 380 to the spindle 30 (exemplarily to the spindle carriage 31 thereof) moves together with the workpiece spindle 30, and the bar remains accurately and reliably guided in the slidable bar guide portion 371. During such movement, the fixture rod 380 slides longitudinally through the through hole 372b and the slidable bar guide portion 371 slides longitudinally through the opening 372a.

Figure 8:
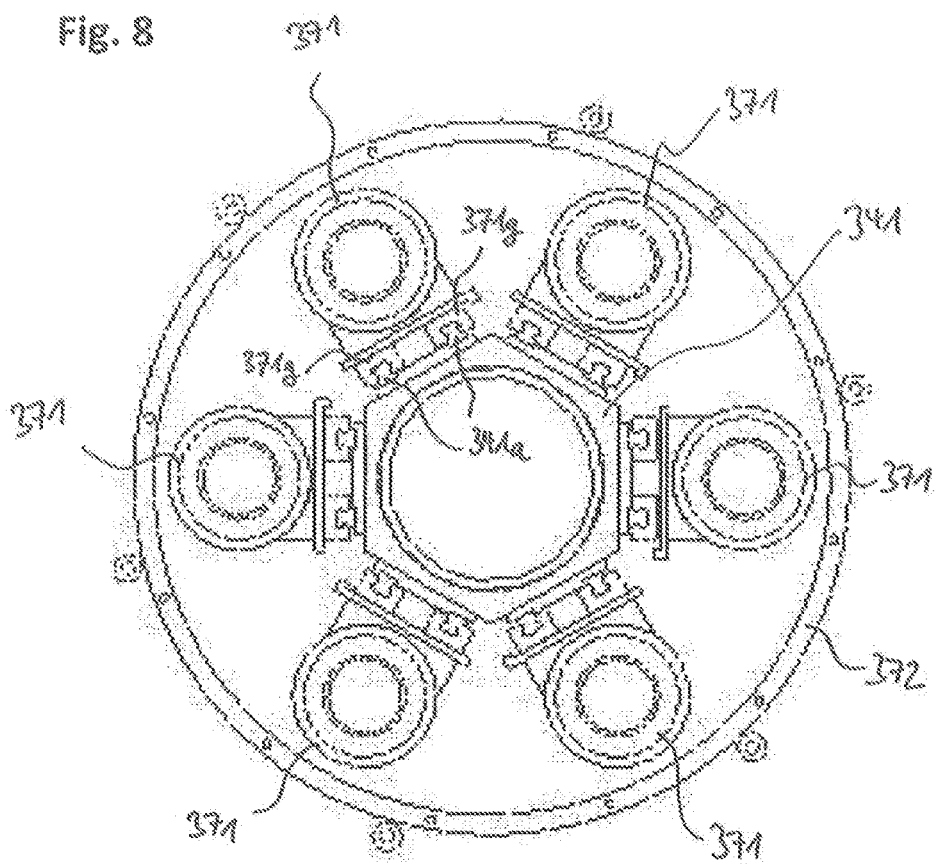
FIG. 8 exemplarily illustrates a schematic cross-sectional view of guide tubes of a bar loader according to FIGS. 6A to 6C.

FIG. 8 exemplary illustrates a schematic cross-sectional view of guide tubes (slidable bar guide portions 371) of a bar loader 300 according to FIGS. 6A to 6C.

Exemplarily the front portion of the rotating body 341 has a hexagonal shape, and the slidable bar guide portions 371 are slidably supported on lateral sides of the rotating body 341. For example, the slidable bar guide portions 371 are mounted on parallel carriages 371g which are guided on longitudinal guides 341a arranged on the lateral sides of the rotating body 341.

Figure 9:
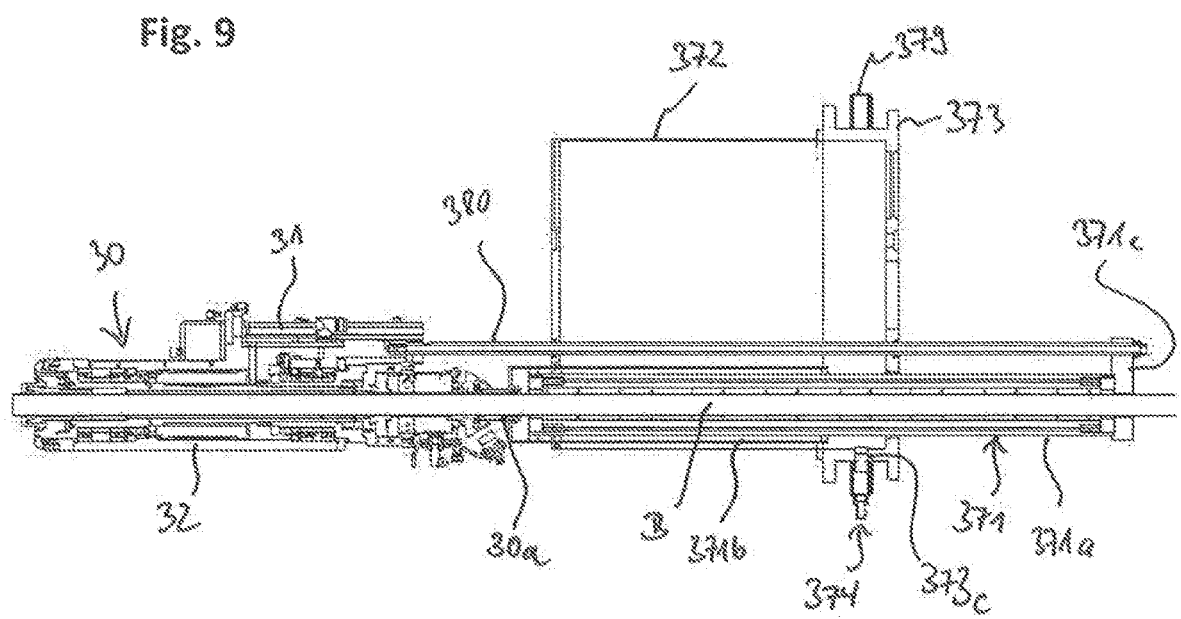
FIG. 9 exemplary illustrates a schematic longitudinal sectional view of a guide tube assembly of a bar loader attached to a spindle of a machine tool.

FIG. 9 exemplary illustrates a schematic longitudinal sectional view of a guide tube assembly according to FIGS. 7A and 7B.

As previously mentioned, the slidable bar guide portion 371 is fixed with the longitudinally extending fixture rod 380 to the spindle 30 (exemplarily to the spindle carriage 31 thereof) via the fixing element 371 being fixed to an end of the slidable bar guide portion 371 facing away from the workpiece spindle 30. The other end of the slidable bar guide portion 371 facing the workpiece spindle 30 is exemplarily connected to the spindle 30 via a hollow-cylinder-shaped connecting element 30a, through which the bar B extends from the slidable bar guide portion 371 into the spindle body 32 of the workpiece spindle 30.

Furthermore, refrigerant liquid and/or lubricant liquid used in the working space on the machined end of the bar B may enter the workpiece spindle 30 and flow through the spindle body 32 to the connecting element 30a and through the connecting element 30a into a collecting tube 371b of the slidable bar guide portion 371 which is open on another end facing away from the workpiece spindle 30, so that the refrigerant liquid and/or lubricant liquid can flow out of the opposite end of the collecting tube 371b into the inner space of the pot body 372.

This has the advantage that the refrigerant liquid and/or lubricant liquid flowing from the respective spindles 30 through the respective connecting elements 30a into the respective collecting tubes 371b of the plural slidable bar guide portions 371 can be commonly collected in the inner space of the pot body 372.

At the opposite end of the (rotating) pot body 372, an outer (non-rotating) collecting ring element 379 is formed, and the collecting ring element 379 has an outlet 374 to conveniently output refrigerant liquid and/or lubricant liquid collected from all spindles 30. The collected refrigerant liquid and/or lubricant liquid may flow from the inner space of the pot body 372 to the collecting ring element 379 through a radially extending through hole 373c of the support body 373, as exemplarily shown in FIG. 9.

This advantageously allows a simple and efficient mechanism to collect refrigerant liquid and/or lubricant liquid from all spindles 30.

As exemplarily shown in FIG. 7B, an exemplarily closed face surface of the support body 373 exemplarily has openings 373a through which the respective slidable bar guide portions 371 (e.g. a guide tube) extend, being movably in the longitudinal direction through the openings 373a. Furthermore, the closed face surface of the support body 373 exemplarily has through holes 373b through which the respective fixture rods 380 extend, being movably in the longitudinal direction through the openings 373b.

Figure 10A:
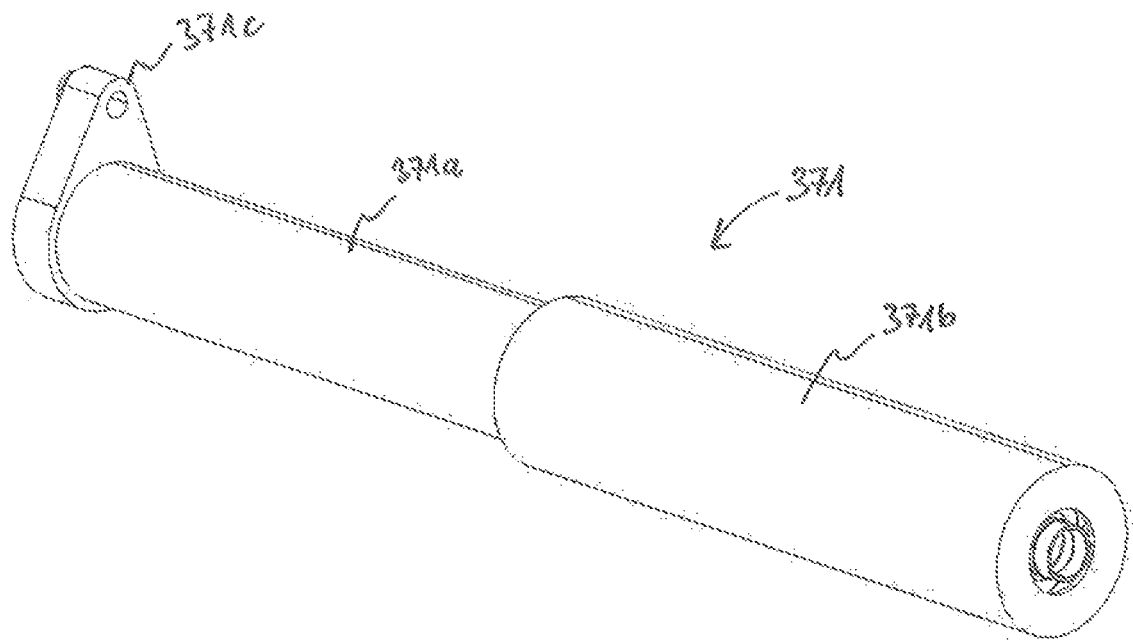
Figure 10B:
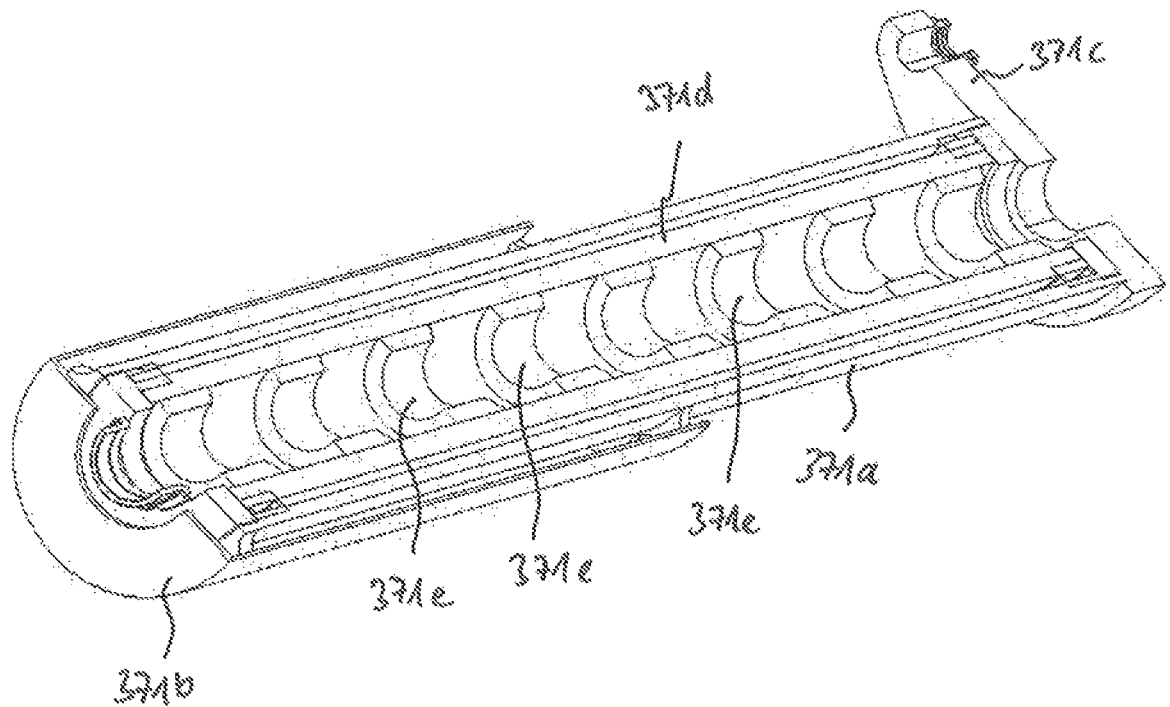

FIGS. 10A to 10C exemplary illustrate schematic views of details of the guide tube assembly (slidable bar guide portion 371) of a bar loader 300 according to FIG. 9, specifically a perspective view in FIG. 10A, a perspective sectional view in FIG. 10B and a cross-sectional view in FIG. 10C.

The guide tube assembly (slidable bar guide portion 371) includes the outer collecting tube 371b described above and an outer guide tube 371a which partially extends into the outer collecting tube 371b with one end thereof and which has, attached on the other end thereof, the fixing element 371c to be fixed to the fixture rod 380.

Within the outer guide tube 371a, an inner guide tube 371d is arranged to be rotatively supported within the outer guide tube 371a, supported by bearings 371f (see FIG. 10C).

A plurality of axially arranged sleeves 371e are provided within the inner guide tube 371d, for slidably supporting the elongated workpiece/bar when extending through and being guided by the guide tube assembly.

When the elongated workpiece/bar is fed to the spindle 30, it slides through the ring-shaped sleeves 371e towards the spindle side, and during the machining operations, when the workpiece is rotatively driven by the workpiece spindle 30, the guided workpiece rotates and the sleeves 371e and inner guide tube 371d rotate about the spindle axis/workpiece axis within the non-rotating outer guide tube 371a.

On the other hand, when the spindle 30 moves the workpiece into the longitudinal Z-direction during the machining operations, the workpiece, the sleeves 371e, the inner and outer guide tubes 371d and 371a as well as the outer collecting tube 371b move together with the spindle 30.

Figure 11A:
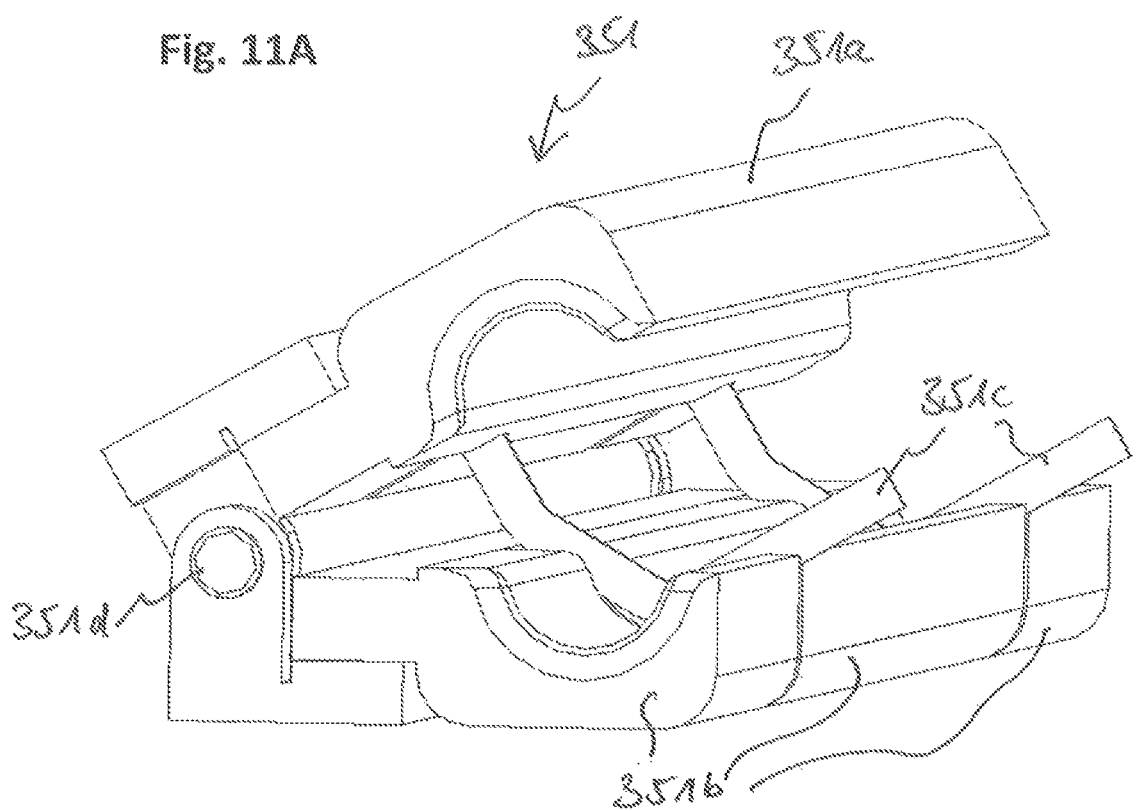
FIGS. 11A and 11B exemplary illustrate schematic perspective views of a bar holder assembly of a bar loader according to exemplary embodiments, and FIGS. 11C and 11D exemplary illustrate schematic front views of the bar holder assembly of FIGS. 11A and 11B in the opened and closed states, respectively.
Figure 11B:
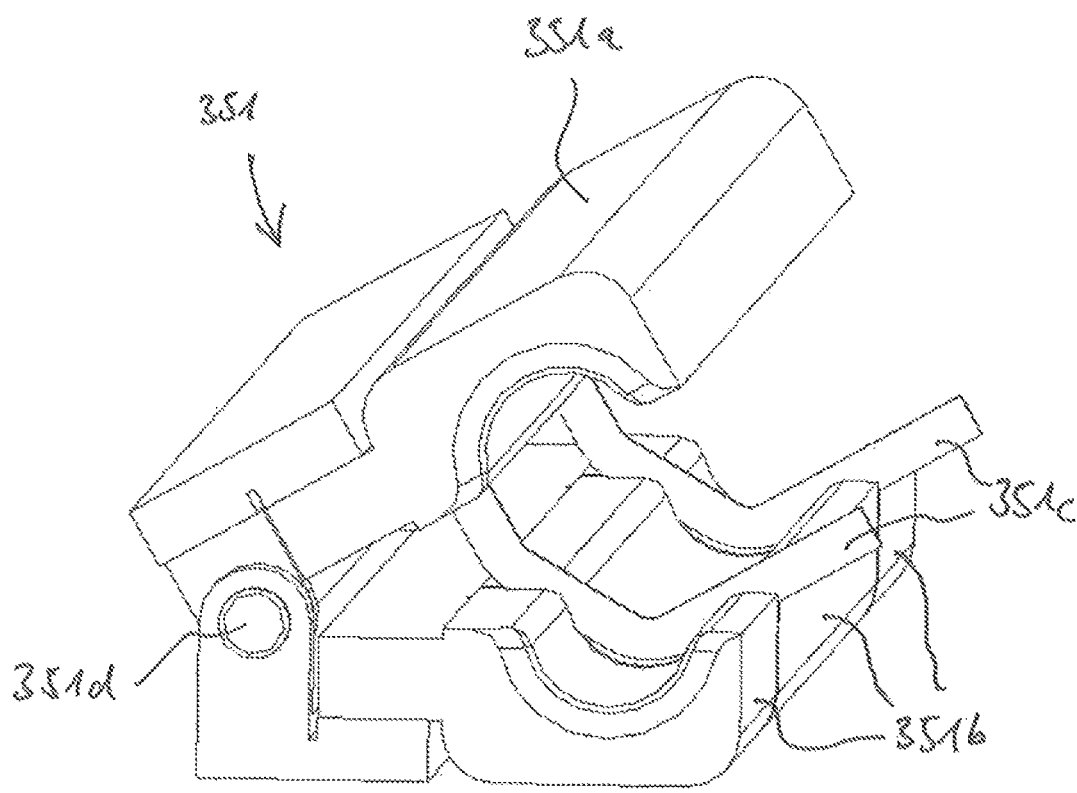

FIGS. 11A and 11B exemplary illustrate schematic perspective views of a bar holder assembly (bar guide portion 351 or 361) of a bar loader 300 according to exemplary embodiments.

The bar guide portion 351 (361) of FIGS. 11A and 11B corresponds to the bar guide portions 351 and 361 shown exemplarily in FIG. 6A. These bar guide portions 351 and 361 are configured to be laterally opened at a loading position to laterally receive an elongated workpiece transferred by the transfer device 392.

The bar guide portion 351 (361) of FIGS. 11A and 11B can be slidably supported on the rotating body 341 of the bar loader 340 (for the movable guide part 350) or be fixed to the rotating body 341 (for the fixed guide part 360).

Figure 11C:
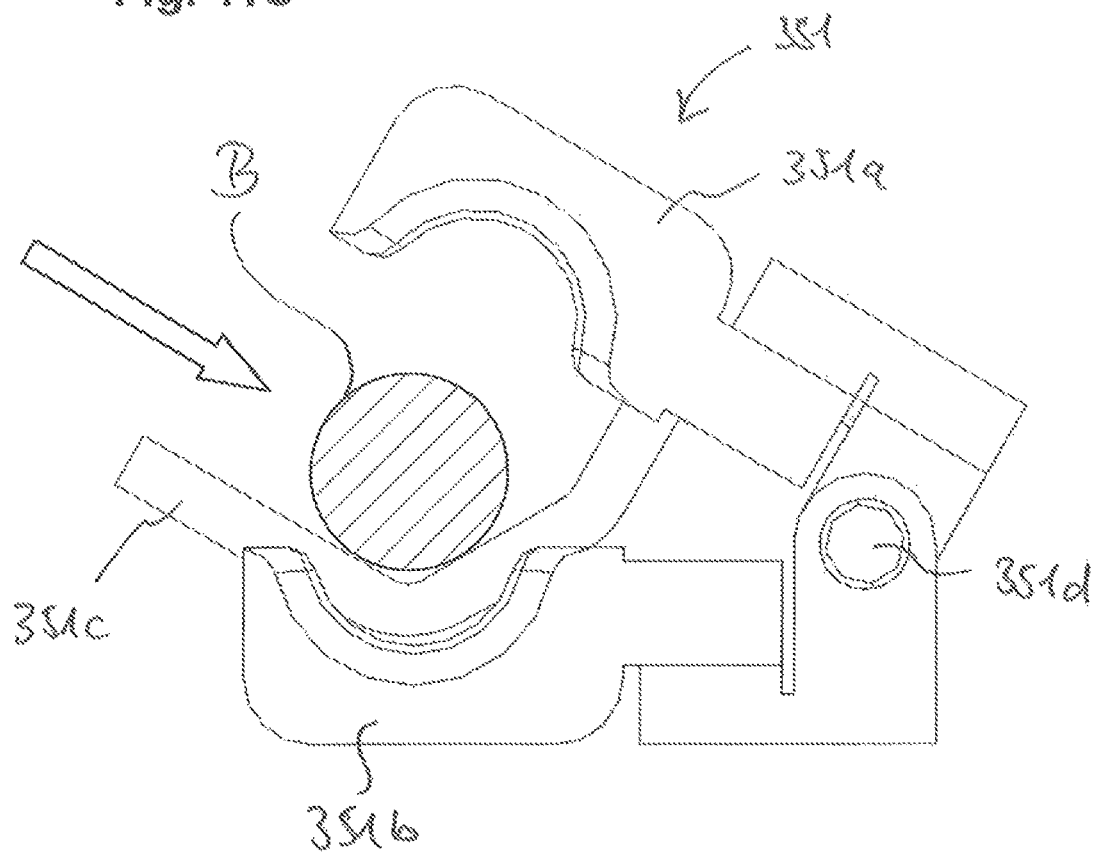

Furthermore, FIGS. 11C and 11C exemplary illustrate schematic front views of the bar holder assembly of FIGS. 11A and 11B in the opened and closed states, respectively.

Specifically, FIG. 11C exemplarily shows a front view of the bar holder assembly in the opened state in which a bar B can be inserted/transferred laterally into the opened bar holder assembly/bar guide portion (specifically in the direction of the arrow as exemplarily shown in FIG. 11C).

Figure 11D:
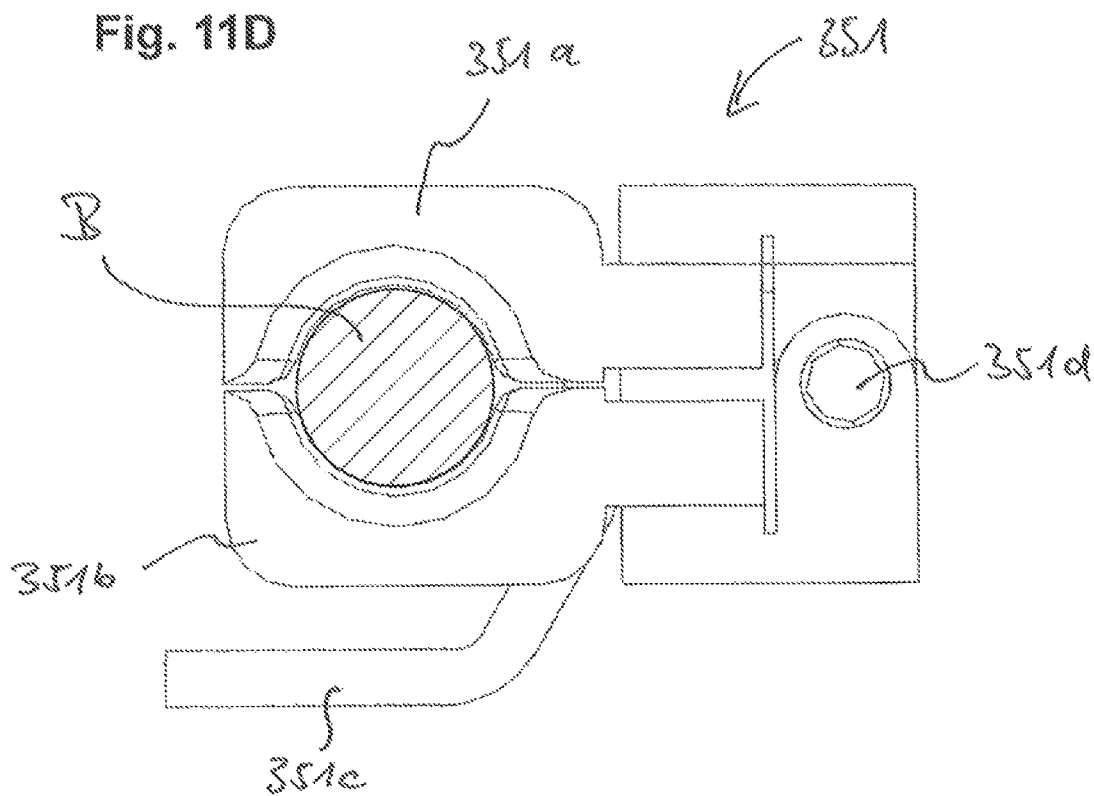

Then, FIG. 11D exemplarily shows a front view of the bar holder assembly in the closed state in which the bar B is held in a guided state within the guiding channel formed inside the closed bar holder assembly/bar guide portion. In such closed state, the bar is guided so that it may move/slide in its axial direction but is held in a guided position with respect to its radial directions (laterally to the axial direction of the bar B).

Exemplarily, the bar guide portion 351 (361) of the bar holder assembly includes an upper guide channel section element 351a and plural lower guide channel section elements 351b which are respectively connected to a pivot element 351d. The upper guide channel section element 351a and the plural lower guide channel section elements 351b are attached to the pivot element 351d so as to pivot about the pivot axis of the pivot element 351d.

FIGS. 11A and 11B, as well as FIG. 11C, exemplarily show an opened state of the bar guide portion 351 (361) in which an elongated workpiece can be received from a lateral opened side of the bar guide portion 351 (361), and when closing the bar guide portion 351 (361) by pivoting the an upper guide channel section element 351a and the plural lower guide channel section elements 351b towards each other, a channel portion for receiving the elongated workpiece is formed by the upper guide channel section element 351a and the plural lower guide channel section elements 351b (see FIG. 11D).

Furthermore, exemplarily, receiving guide elements 351c are attached to the upper guide channel section element 351a so as to pivot together with the upper guide channel section element 351a. In the opened state of the bar guide portion 351 (361), the receiving guide elements 351c respectively rise between the lower guide channel section elements 351b into a space between the upper and lower channel section elements such that a V-shaped portion of the receiving guide elements 351c is positioned above a workpiece channel groove of the lower channel section elements 351b (see FIG. 11C).

In the opened state of the bar guide portion 351 (361), one side of the V-shaped portion of the receiving guide elements 351c extends out of the bar guide portion 351 (361) at an inclination so as to allow a bar/elongated workpiece to roll or slide from the outside of the bar guide portion 351 (361) towards the tip-portion of the V-shaped portion of the receiving guide elements 351c (see arrow in FIG. 11C).

When an elongated workpiece/bar is received in the opened bar guide portion 351 (361) at the tip-portion of the V-shaped portion of the receiving guide elements 351c (see the position of the bar B in FIG. 11C), the elongated workpiece/bar can be received in a closed guide channel portion of the bar guide portion 351 (361) by pivoting the an upper guide channel section element 351a and the plural lower guide channel section elements 351b towards each other. By such pivot movement, the receiving guide elements 351c pivot together with the upper guide channel section element 351a and disappear between the plural lower guide channel section elements 351b (see FIG. 11D).

The plural lower guide channel section elements 351b are respectively separated by a gap allowing a respective receiving guide element 351c attached to the upper guide channel section element 351a to rise through or from the gap (FIGS. 11A to 11C) and to disappear in or through the gap (FIG. 11D), by the respective pivot movements of the upper guide channel section element 351a and the plural lower guide channel section elements 351b.

The above configuration has the advantage that the elongated workpiece can be inserted smoothly into the opened bar guide portion 351 (361) via the inclined portions of the receiving guide elements 351c (see arrow in FIG. 11C), and the position of the elongated workpiece during the closing movement can be precisely defined by simple means via the V-shaped portion (see the position of the bar B in FIG. 11C).

By exemplary embodiments as described above, there are proposed beneficial aspects and features to enhance the machining options of the multi-spindle turning machine, to provide a compact machine concept, allowing for more flexible, accurate, efficient and reliable machining operations, and/or to improve accuracy and/or stability of the machine tool.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope of disclosure of the present invention. Those skilled in the art will also appreciate, in view of this disclosure, that different embodiments of the invention described herein may be combined to form other embodiments of the invention. Therefore, it is to be understood that, the invention may be practiced other than as specifically described herein.

The invention claimed is:

1. A bar loader apparatus configured to be used with a machine tool including (i) a plurality of workpiece spindles respectively configured to move in a longitudinal direction that is axially arranged with respect to a spindle axis of each workpiece spindle of the plurality of workpiece spindles, the plurality of workpiece spindles being configured to receive a plurality of elongated workpieces, and (ii) a turret body rotatably supported about a turret axis by a machine frame of the machine tool, the bar loader apparatus comprising:

a storage portion configured to store the plurality of elongated workpieces;

a loading system configured to load an elongated workpiece of the plurality of elongated workpieces from the loading system to a corresponding workpiece spindle of the plurality of workpiece spindles of the machine tool;

a transfer device configured to transfer the elongated workpiece of the plurality of elongated workpieces from the storage portion to the loading system;

for each workpiece spindle of the plurality of workpiece spindles of the machine tool, a respective workpiece guide channel assembly configured to receive and guide a respective elongated workpiece of the plurality of elongated workpieces, the respective workpiece guide channel assembly including a fixed guide channel portion and at least one slidable guide channel portion, the at least one slidable guide channel portion being movable in the longitudinal direction of the respective workpiece spindle of the plurality of workpiece spindles;

a rotatably supported turret fixture body configured to be attached to the turret body and rotate together with the turret body of the machine tool about the turret axis; and a rotatable pot body configured to rotate with the turret fixture body, the turret fixture body and the plurality of workpiece spindles being supported by the turret body, the rotatable pot body being configured to collect cooling or lubricating liquid output from back-side portions of the plurality of workpiece spindles.

2. The bar loader according to claim 1, wherein:
the respective workpiece guide channel assembly is configured to be axially arranged with respect to the spindle axis of a corresponding workpiece spindle of the plurality of workpiece spindles; and
the fixed guide channel portion of the respective workpiece guide channel assembly extends in the longitudinal direction or the at least one slidable guide channel portion of the respective workpiece guide channel assembly extends in the longitudinal direction.

3. The bar loader according to claim 1, wherein the fixed guide channel portion of the respective workpiece guide channel assembly is configured to (i) be opened laterally and receive an elongated workpiece of the plurality of elongated workpieces transferred from the storage portion by the transfer device, and (ii) be closed to form a guide channel to hold the received elongated workpiece of the plurality of elongated workpieces.

4. The bar loader according to claim 1, wherein the at least one slidable guide channel portion of the respective workpiece guide channel assembly includes a guide tube having a guide channel for configured to guide the respective elongated workpiece.

5. The bar loader according to claim 4, wherein the guide tube is either (i) rotationally fixed, or (ii) is rotatably supported and configured to rotate about an axial direction of the guide tube.

6. The bar loader according to claim 4, wherein:
the respective workpiece guide channel assembly includes at least two slidable guide channel portions, and
a secondary slidable guide channel portion of the of the at least two slidable guide channel portions is configured to (i) be opened laterally and receive an elongated workpiece of the plurality of elongated workpieces transferred from the storage portion by the transfer device, and (ii) be closed to form a guide channel around the received elongated workpiece to hold the received elongated workpiece.

7. The bar loader according to claim 6, wherein the secondary slidable guide channel portion is disposed between the guide tube and the fixed guide channel portion.

8. The bar loader according to claim 3, wherein the bar loader is configured to laterally open the fixed guide channel portion and the at least one slidable guide channel portion of the respective workpiece guide together in order to receive an elongated workpiece transferred from the storage portion by the transfer device in the fixed guide channel portion and the at least one slidable guide channel portion of the respective workpiece guide.

9. The bar loader according to claim 8, wherein either the fixed guide channel portion or the at least one slidable guide channel portion includes one or more guide assemblies, each guide assembly of the one or more guide assemblies including a first guide channel element and one or more second guide channel elements pivotable relatively with respect to the first guide channel element so as to close and open the respective guide channel portion.

10. The bar loader according to claim 9, wherein one or more guide elements have a V-shaped portion configured to laterally receive an elongated workpiece of the plurality of elongated workpieces in an opened state of the respective guide channel portion, the one or more guide elements being attached to the first guide channel element to pivot, together with the first guide channel element, relatively with respect to the one or more second guide channel elements.

11. The bar loader according to claim 10, wherein the one or more guide elements having the V-shaped portion are attached to the first guide channel element so as to (i) extend into a region between the first guide channel element and the second guide channel elements when pivoting the first guide channel element and the second guide channel elements away from each other and opening the respective guide channel portion, or so as to (ii) disappear from the region between the first guide channel element and the second guide channel elements into or through a space adjacent to or between the one or more second guide channel elements when pivoting the first guide channel element and the second guide channel elements towards each other and closing the respective guide channel portion.

12. The bar loader according to claim 1, wherein:
the loading system includes for each workpiece spindle of the plurality of workpiece spindles, a respective associated workpiece guide channel assembly, and
the at least one slidable guide channel portion of the respective associated workpiece guide channel assembly is movable into the longitudinal direction of the spindle axis of the respective associated workpiece spindle independently of remaining slidable guide channel portions of the at least one slidable guide channel portion.

13. The bar loader according to claim 1, wherein the rotatable pot body is rotatably supported at a non-rotating collecting ring element having at least one outlet for cooling or lubricating liquid collected within the rotatable pot body.

14. A machine tool comprising:
at least one workpiece spindle configured to receive an elongated workpiece; and
the bar loader apparatus according to claim 1.

15. A bar loader apparatus configured to be used with a machine tool including at least one workpiece spindle that is configured to receive an elongated workpiece, the bar loader apparatus comprising:
a storage portion configured to store a plurality of elongated workpieces including the elongated workpiece;
a loading system configured to load the elongated workpiece of the plurality of elongated workpieces from the loading system to a corresponding workpiece spindle of the at least one workpiece spindle;
a transfer device configured to transfer the elongated workpiece of the plurality of elongated workpieces from the storage portion to the loading system; and
for each workpiece spindle of the plurality of workpiece spindles of the machine tool, a respective workpiece guide channel assembly configured to receive and guide a respective elongated workpiece of the plurality of elongated workpieces, the respective workpiece guide channel assembly including a fixed guide channel portion and at least one slidable guide channel portion, the at least one slidable guide channel portion being movable in the longitudinal direction of the respective workpiece spindle of the plurality of workpiece spindles,
wherein the fixed guide channel portion of the respective workpiece guide channel assembly is configured to (i) be opened laterally and receive an elongated workpiece of the plurality of elongated workpieces transferred from the storage portion by the transfer device, and (ii)

be closed to form a guide channel to hold the received elongated workpiece of the plurality of elongated workpieces.

16. A bar loader apparatus configured to be used with a machine tool including at least one workpiece spindle that is configured to receive an elongated workpiece, the bar loader apparatus comprising:
- a storage portion configured to store a plurality of elongated workpieces including the elongated workpiece;
- a loading system configured to load the elongated workpiece of the plurality of elongated workpieces from the loading system to a corresponding workpiece spindle of the at least one workpiece spindle;
- a transfer device configured to transfer the elongated workpiece of the plurality of elongated workpieces from the storage portion to the loading system; and
- for each workpiece spindle of the plurality of workpiece spindles of the machine tool, a respective workpiece guide channel assembly configured to receive and guide a respective elongated workpiece of the plurality of elongated workpieces, the respective workpiece guide channel assembly including a fixed guide channel portion and at least one slidable guide channel portion, the at least one slidable guide channel portion being movable in the longitudinal direction of the respective workpiece spindle of the plurality of workpiece spindles, wherein the at least one slidable guide channel portion of the respective workpiece guide channel assembly includes a guide tube having a guide channel configured to guide the elongated workpiece, and the guide tube is either (i) rotationally fixed, or (ii) is rotatably supported and configured to rotate about an axial direction of the guide tube.

17. A bar loader apparatus configured to be used with a machine tool including at least one workpiece spindle that is configured to receive an elongated workpiece, the bar loader apparatus comprising:
- a storage portion configured to store a plurality of elongated workpieces including the elongated workpiece;
- a loading system configured to load the elongated workpiece of the plurality of elongated workpieces from the loading system to a corresponding workpiece spindle of the at least one workpiece spindle;
- a transfer device configured to transfer the elongated workpiece of the plurality of elongated workpieces from the storage portion to the loading system; and
- for each workpiece spindle of the plurality of workpiece spindles of the machine tool, a respective workpiece guide channel assembly configured to receive and guide a respective elongated workpiece of the plurality of elongated workpieces, the respective workpiece guide channel assembly including a fixed guide channel portion and at least one slidable guide channel portion, the at least one slidable guide channel portion being movable in the longitudinal direction of the respective workpiece spindle of the plurality of workpiece spindles, wherein:
- the at least one slidable guide channel portion of the respective workpiece guide channel assembly includes a guide tube having a guide channel configured to guide the elongated workpiece,
- the respective workpiece guide channel assembly includes at least two slidable guide channel portions, and
- a secondary slidable guide channel portion of the of the at least two slidable guide channel portions is configured to (i) be opened laterally and receive an elongated workpiece of the plurality of elongated workpieces transferred from the storage portion by the transfer device, and (ii) be closed to form a guide channel around the received elongated workpiece to hold the received elongated workpiece.

18. A bar loader apparatus configured to be used with a machine tool including at least one workpiece spindle that is configured to receive an elongated workpiece, the bar loader apparatus comprising:
- a storage portion configured to store a plurality of elongated workpieces including the elongated workpiece;
- a loading system configured to load the elongated workpiece of the plurality of elongated workpieces from the loading system to a corresponding workpiece spindle of the at least one workpiece spindle;
- a transfer device configured to transfer the elongated workpiece of the plurality of elongated workpieces from the storage portion to the loading system;
- for each workpiece spindle of the plurality of workpiece spindles of the machine tool, a respective workpiece guide channel assembly configured to receive and guide a respective elongated workpiece of the plurality of elongated workpieces, the respective workpiece guide channel assembly including a fixed guide channel portion and at least one slidable guide channel portion, the at least one slidable guide channel portion being movable in the longitudinal direction of the respective workpiece spindle of the plurality of workpiece spindles; and
- a rotatably supported turret fixture body configured to be attached to a turret body of the machine tool and to rotate together with the turret body of the machine tool about the turret axis.

* * * * *